United States Patent [19]
Kurland et al.

[11] Patent Number: 4,603,232
[45] Date of Patent: Jul. 29, 1986

[54] RAPID MARKET SURVEY COLLECTION AND DISSEMINATION METHOD

[75] Inventors: Lawrence G. Kurland, Melville; George Shababb, Roslyn Heights, both of N.Y.

[73] Assignee: NPD Research, Inc., Port Washington, N.Y.

[21] Appl. No.: 654,102

[22] Filed: Sep. 24, 1984

[51] Int. Cl.⁴ .......................................... H04M 11/00
[52] U.S. Cl. .................................... 179/2 AS; 358/84
[58] Field of Search ....................... 179/2 AS; 358/84; 455/2

[56] References Cited

U.S. PATENT DOCUMENTS

| | | | |
|---|---|---|---|
| 4,216,497 | 8/1980 | Ishman et al. | 358/84 |
| 4,264,924 | 4/1981 | Freeman | 358/86 |
| 4,355,372 | 10/1982 | Johnson et al. | |
| 4,536,791 | 8/1985 | Campbell et al. | 358/84 X |
| 4,546,382 | 10/1985 | McKenna et al. | 358/84 |
| 4,566,030 | 1/1986 | Nickerson et al. | 358/84 |
| 4,573,072 | 2/1986 | Freeman | |

FOREIGN PATENT DOCUMENTS

| | | | |
|---|---|---|---|
| 128481 | 12/1984 | European Pat. Off. | 358/84 |
| 57-113673 | 7/1982 | Japan | 179/2 AS |
| 1536414 | 12/1978 | United Kingdom | 358/84 |

Primary Examiner—Keith E. George
Attorney, Agent, or Firm—Stiefel, Gross, Kurland & Pavane

[57] ABSTRACT

A method for independently centrally electronically accumulating market survey data from different content rapidly disseminated multiple inquiry market surveys from a plurality of panelist stations (14, 16, 18, 20) located at diverse locations. Variable market survey questionnaires to diverse located panelists may be remotely rapidly disseminated from a centrally located host computer (12) to the panelist stations (14, 16, 18, 20) over a common communications link (22 or 104) for individual visual display at the panelist stations (14, 16, 18, 20), such as on a CRT (42) or television set (44) or alphanumeric display (45), with the displayed questionnaires resulting from a downstream loaded set of control instructions stored in a local survey program RAM (54) whose content may be remotely varied from the head end or host computer (12). The individualized responses provided by the panelists are locally processed (34, 50), temporarily stored in a local survey data RAM (52) and subsequently transmitted back to the host computer (12) via a telephone type link (22) where they are accumulatively processed in a rapid fashion. Multiple different surveys can be downstream loaded to individual panelists, or to a subgroup of panelists, or to all panelists, and follow up surveys and/or tailored surveys can also be rapidly conducted, all under the control of the host computer (12) at the head end providing a rapid and flexible survey collection and dissemination method.

17 Claims, 31 Drawing Figures

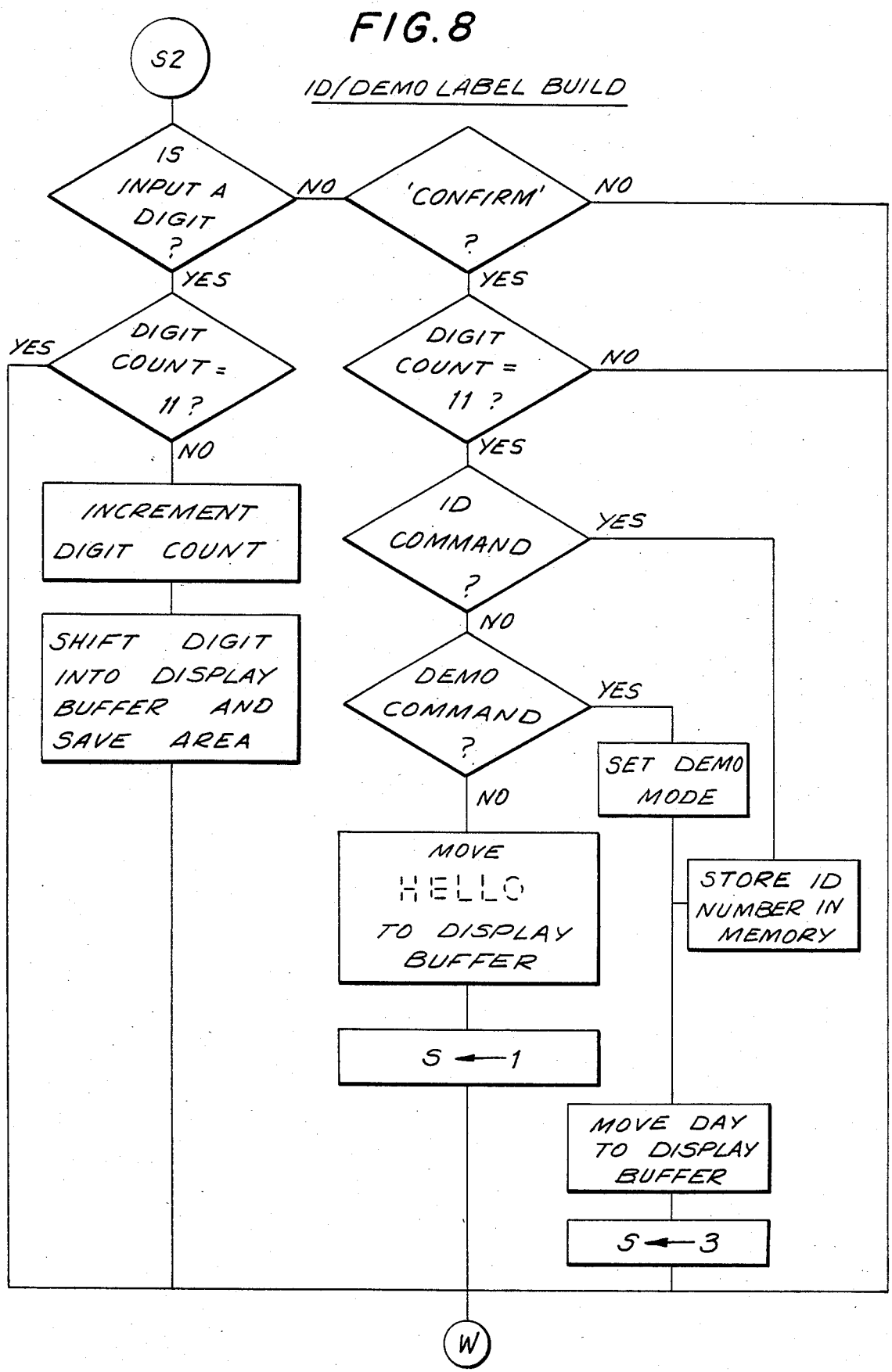

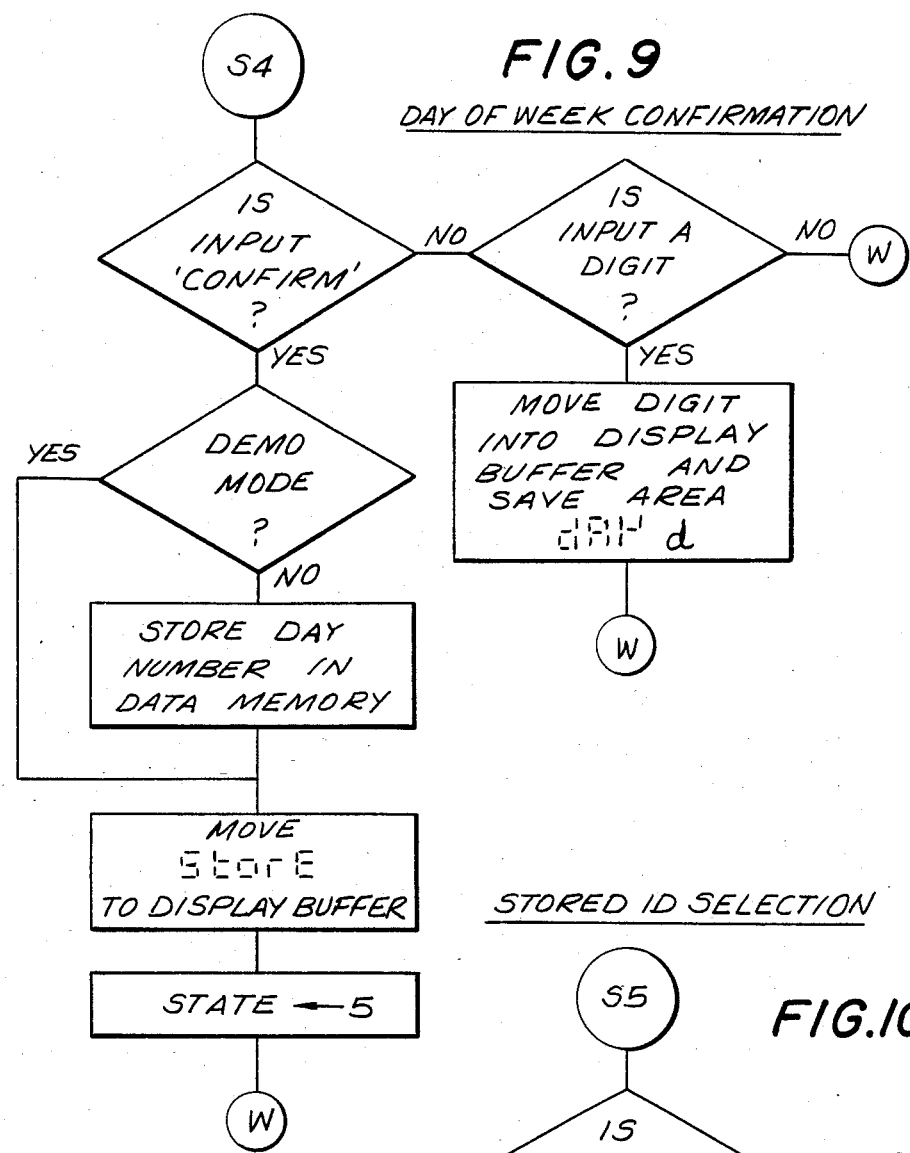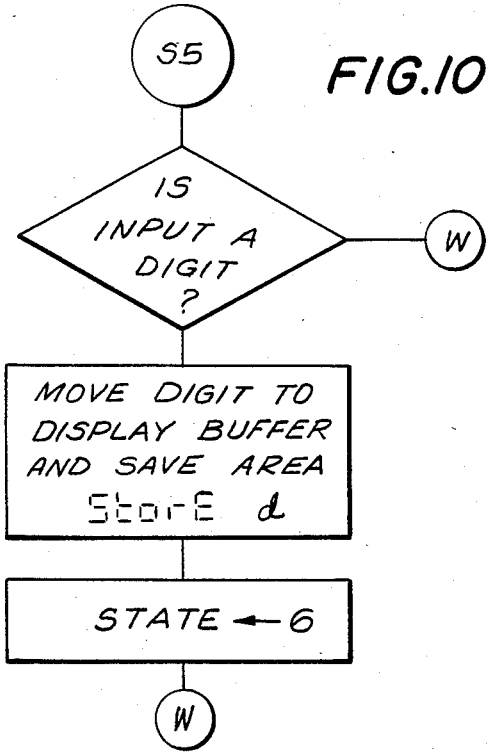

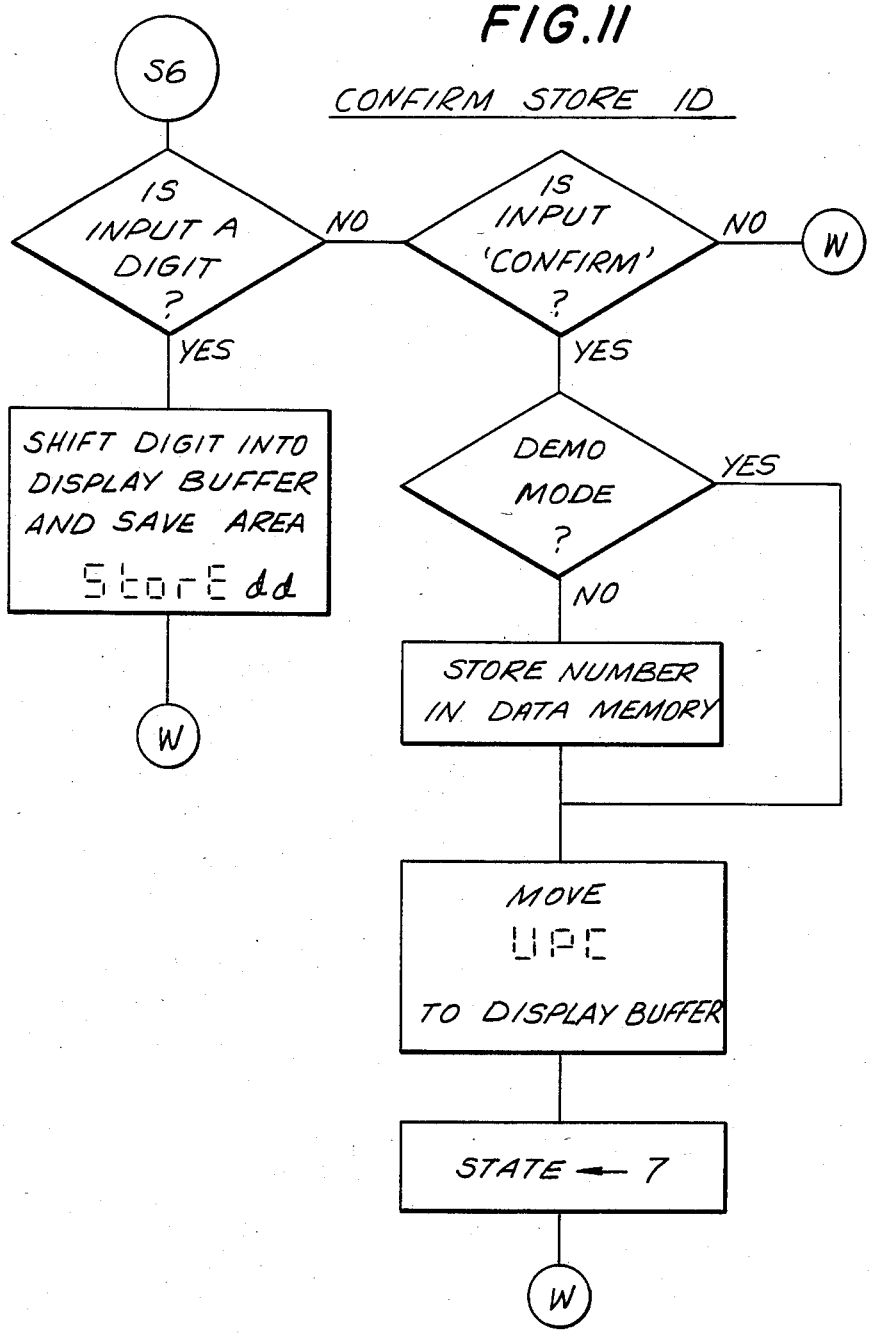

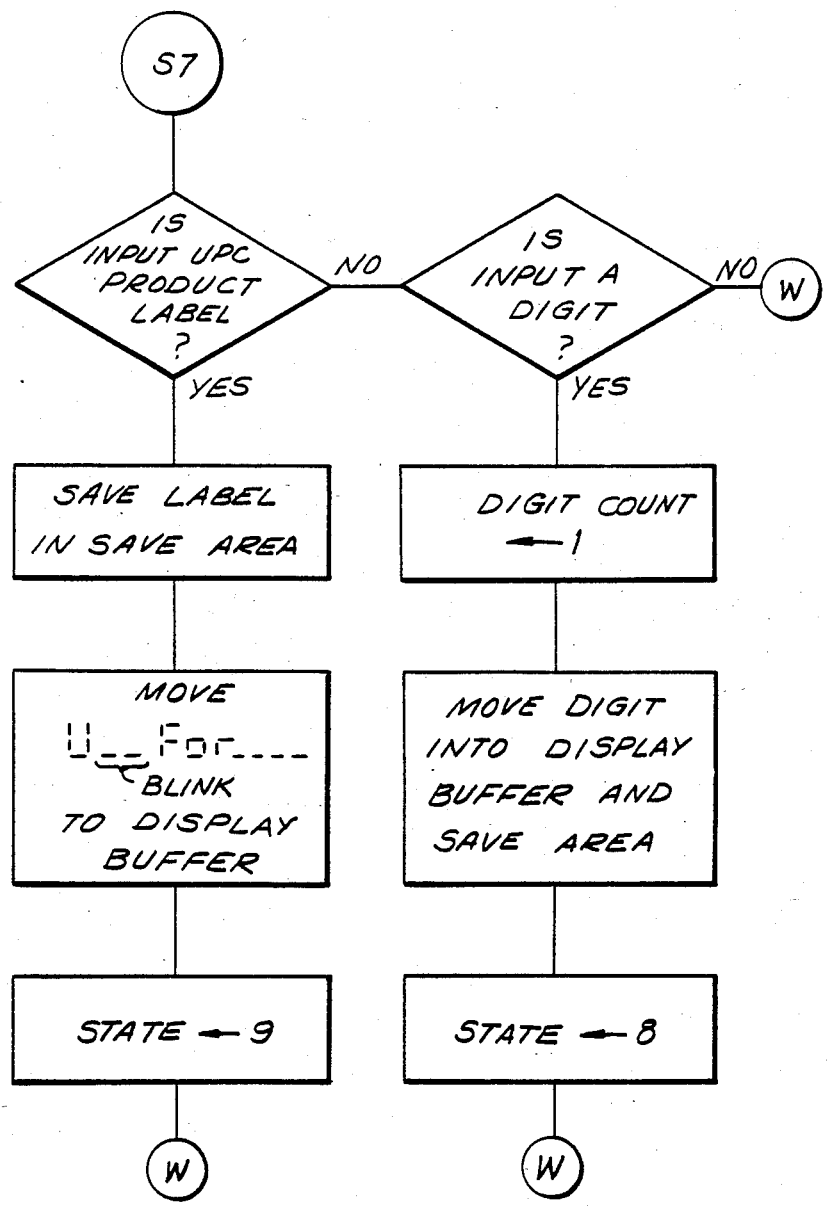

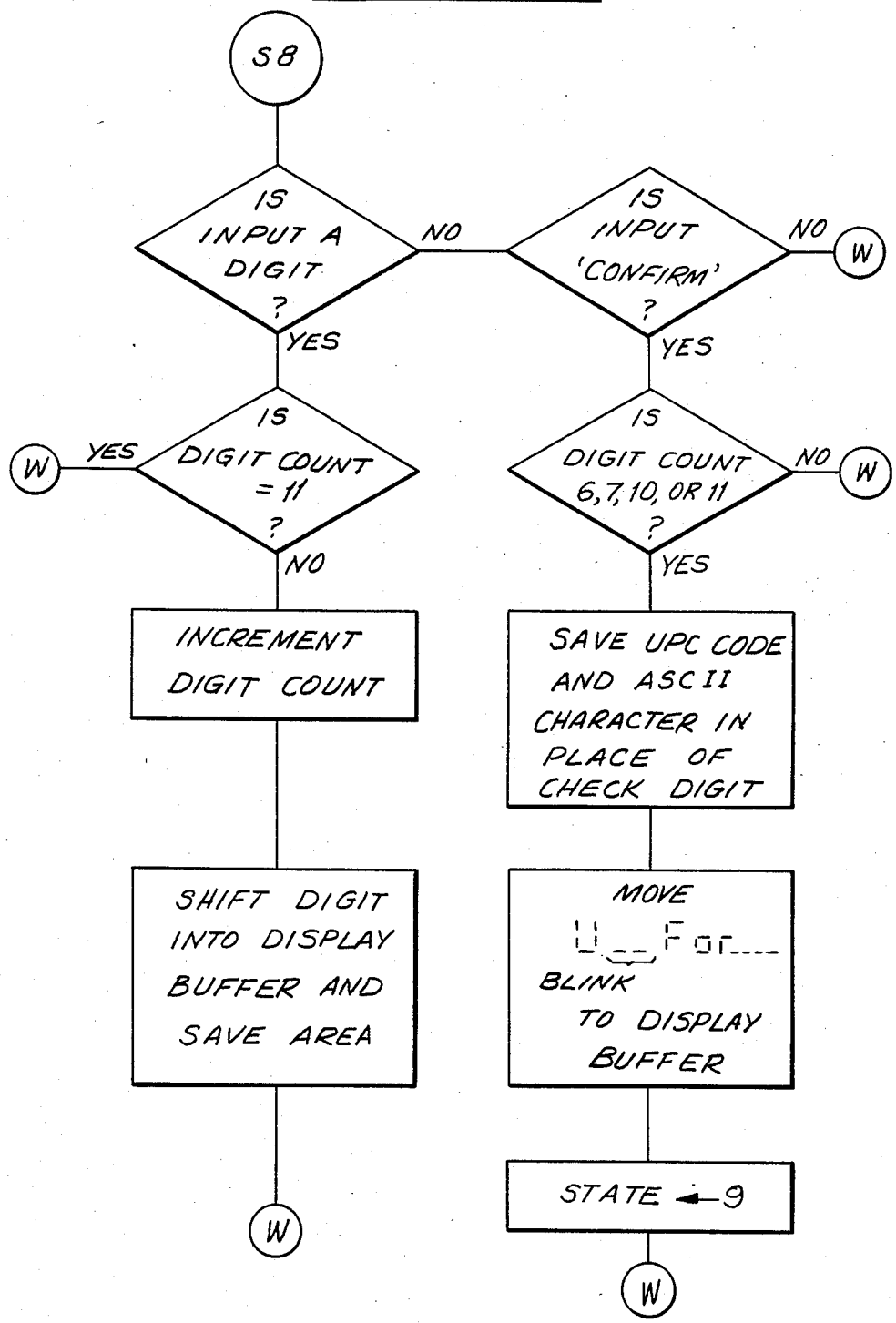

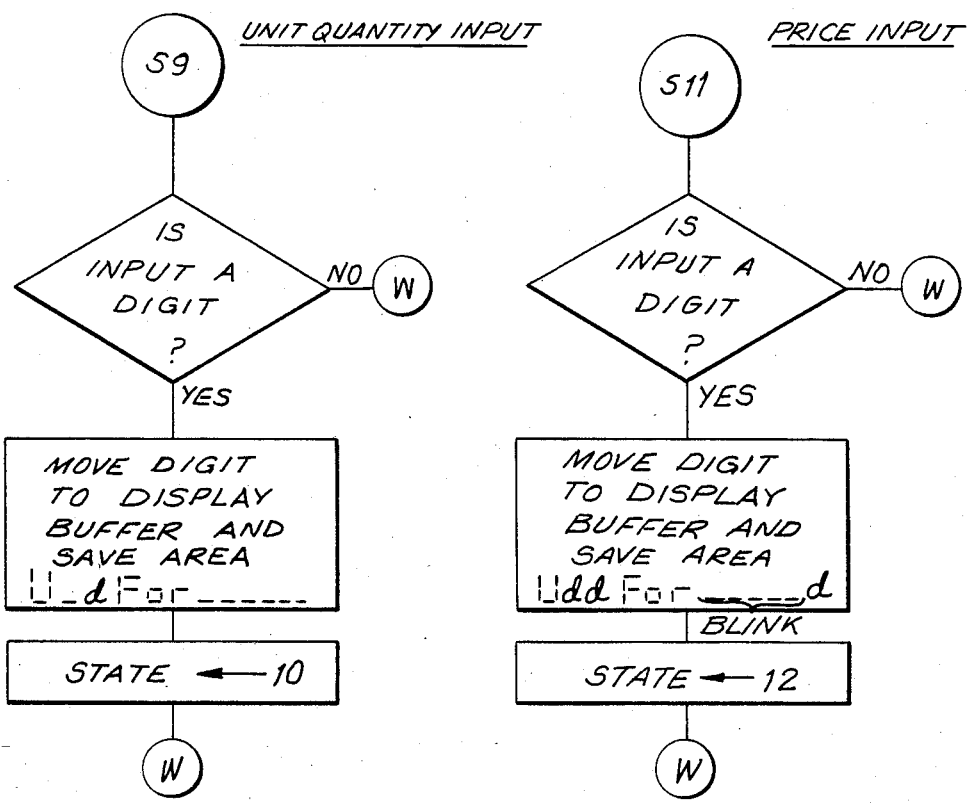

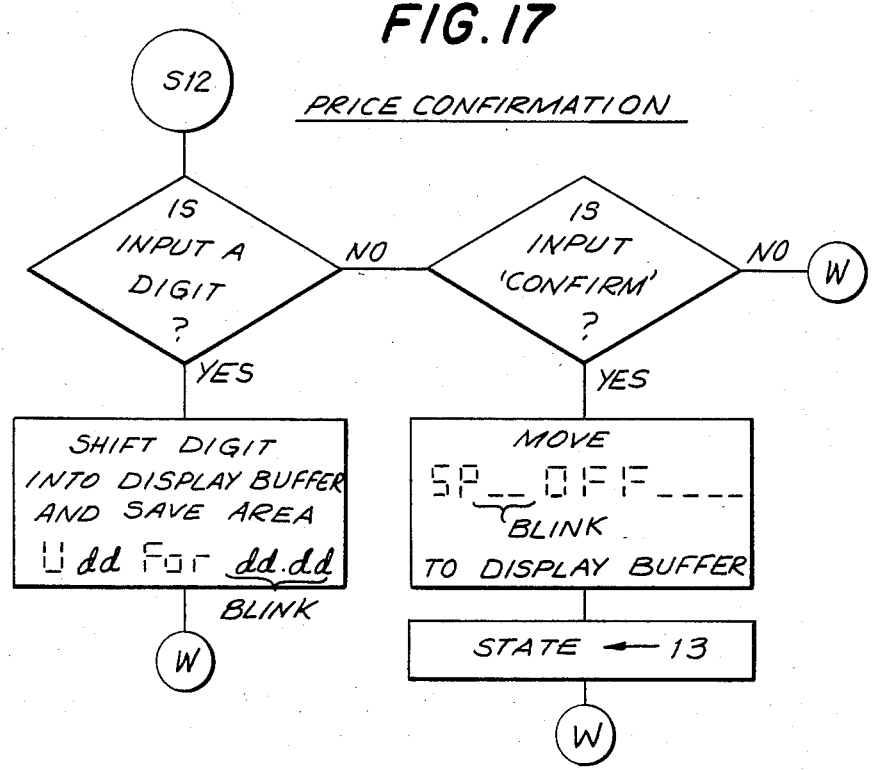
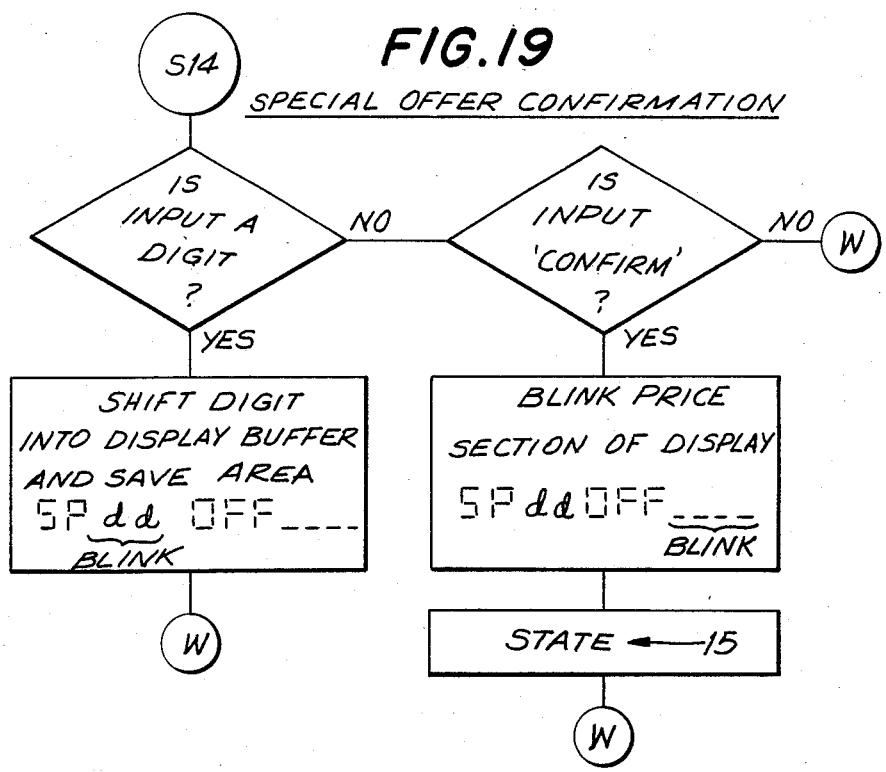

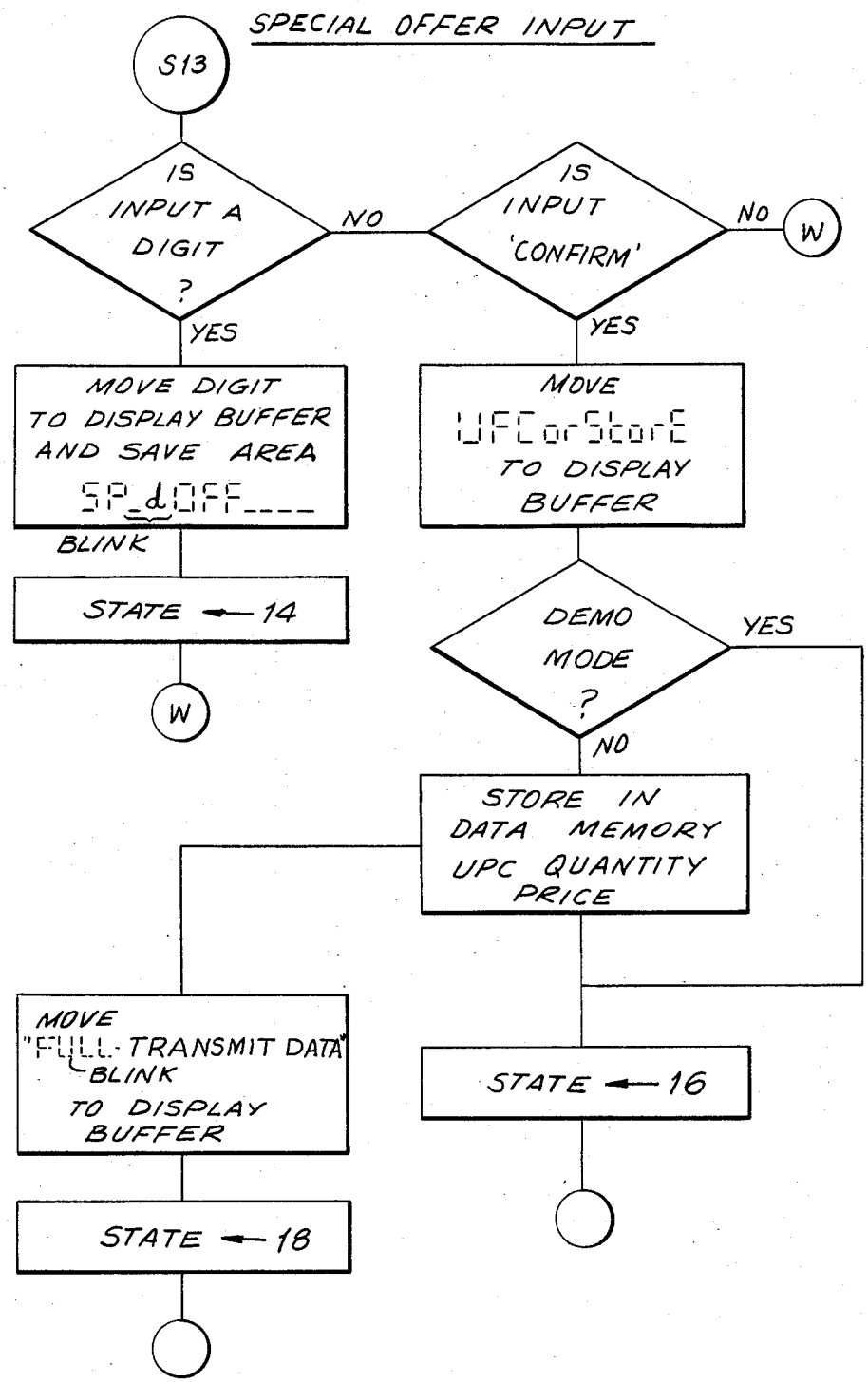

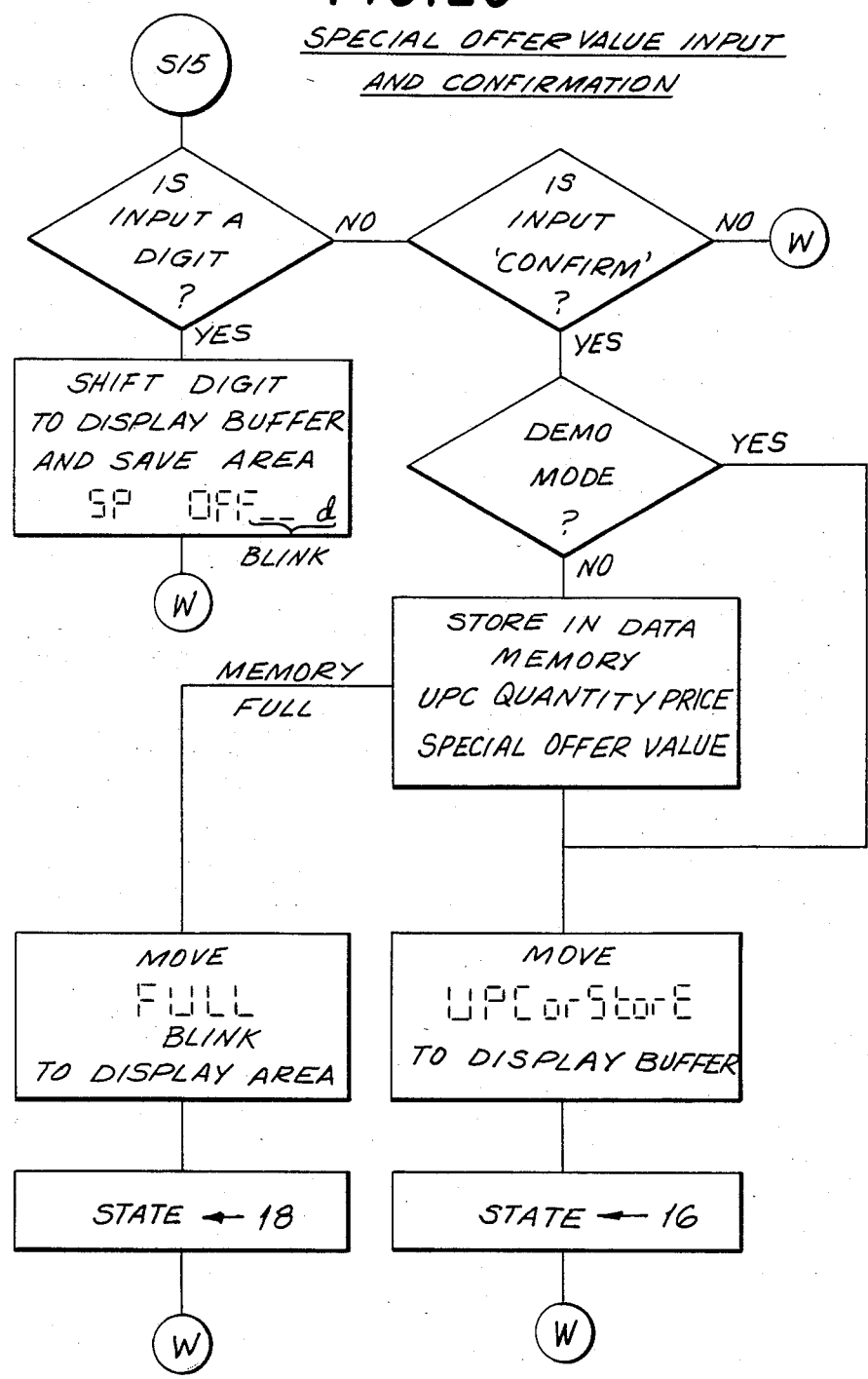

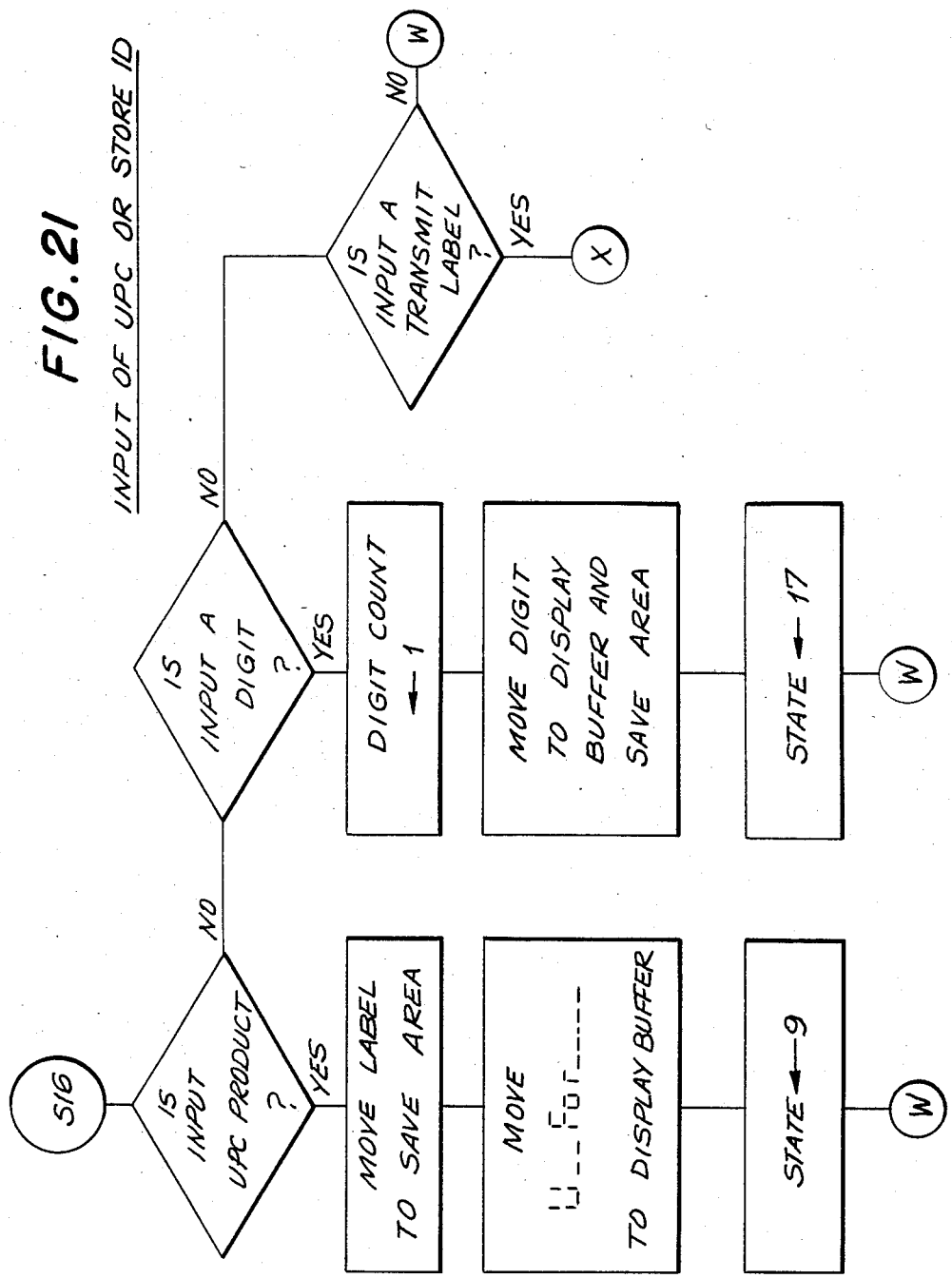

TERMINATE UPC OR STORE INPUT

TRANSMIT COMMAND

TRANSMIT CONFIRMATION

MEMORY ERASE CONFIRMATION

ERASE LABEL BUILD

FIG. 29

DISPLAY STATE SUMMARY

| STATE | DISPLAY |
|---|---|
| S1 | HELLo |
| S2 | dddddddddd |
| S3 | dAY |
| S4 | dAY      d |
| S5 | StorE |
| S6 | StorE      dd |
| S7 | UPC |
| S8 | dddddddddd |
| S9 | U __ For ____ (BLINK) |
| S10 | U __ For ____ (BLINK) |
| S11 | U __ For ____ (BLINK) |
| S12 | U __ For ____ (BLINK) |
| S13 | SP __ oFF ____ (BLINK) |
| S14 | SP __ oFF ____ (BLINK) |
| S15 | SP __ oFF ____ (BLINK) |
| S16 | UPC or StorE |
| S17 | dddddddd |
| S18 | "FULL-TRANSMIT DATA" |
| S19 | Door trASE (BLINK) |
| S20 | dddddddd |
| S21 | ErASE ? (BLINK) |

NOTE d = DISPLAY DIGIT

S22 — SELECT SURVEY

S23 — SURVEY NOT AVAILABLE

FIG. 30

INPUT SERVICE ROUTINE

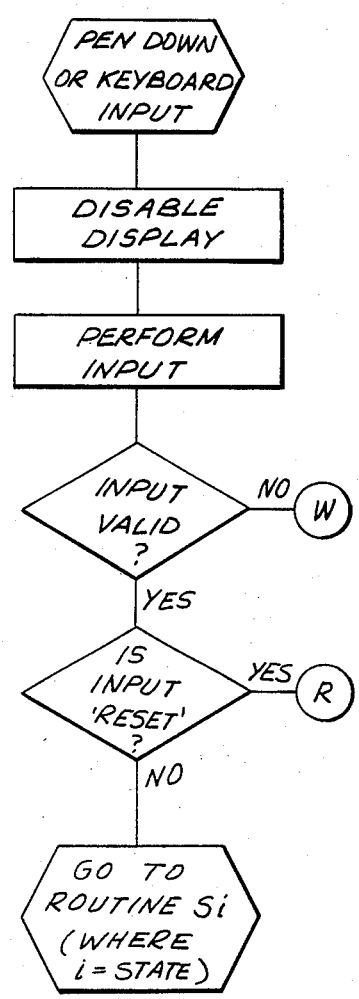

RAPID MARKET SURVEY COLLECTION AND DISSEMINATION METHOD

TECHNICAL FIELD

The present invention relates to a method for independently centrally electronically accumulating market survey data from different content rapidly disseminated market surveys from a plurality of panelist stations located at diverse locations.

BACKGROUND OF THE ART

Market survey data collection systems are well known in the art. One of the more common prior art systems for collecting such data involves the use of survey booklets or questionnaires which are disseminated by mail to a diverse group of panelists, individually hand written into by the panelists to record the survey data relating to their particular shopping habits for various identified products, mailed back to the survey company by the panelist where the data is then key punched and ultimately read into a data processor or computer for accumulative processing of all of this data. This procedure, although satisfactory under most circumstances, is time consuming, costly and provides many opportunities for erroneous data entry due to carelessness either by the panelist who is writing in the data by hand or by the keypunch operator who is subsequently encoding the hand-written data. Moreover, there are limitations in this technique which inhibit the ability of the survey organization to at any time rapidly change the survey or rapidly conduct follow-up or modified surveys based on the results of a prior survey, as well as to rapidly collect and analyze the survey data. With the advent of electronic inventory control and supermarket scanners there has been considerable interest in bringing market data collection into the electronic age. An example of such a market survey data collection method is disclosed in commonly owned U.S. Pat. No. 4,355,372 which discloses an electronic market survey data collection method for independently electronically collecting related market survey data from a plurality of diverse locations which overcomes many of the disadvantages of the prior art. In the disclosed method, the collected survey data is temporarily stored at each of the independent diverse locations for subsequent transmission thereof over a telephone type link for accumulative processing thereof at a remote central electronic data processor. At each of the independent data collection locations, an interactive changeable prompt message display is provided on an alphanumeric visual display device in a portable hand held terminal, indicating a particular one of a plurality of market survey information categories in a predefined sequence of these categories. A market survey data input signal corresponding to the particular displayed category is then provided to a buffer storage in response to the interactive prompt message display. The actual data input from the buffer storage is then displayed on the alphanumeric visual display device in order to enable verification of the correctness of the input, in which instance a confirmation command input signal is then provided to a microcomputer in the terminal. The content of the buffer storage is then temporarily stored in a static memory in response to the confirmation command input signal. This interactive sequence recycles for each market survey data transaction. Thus, several problems present in the prior art are overcome by this method; however, this method does not involve the downstream loading of any survey questionnaires or the ability to provide multiple surveys to the same panelist or different surveys to different panelists or to rapidly change the survey content or conduct a modified survey based on the results of a prior survey by merely downstream loading a new survey questionnaire over a two way communications link which permits transmission of the survey results back to a central data processor. Thus, although there is rapid survey data collection via telephone there is no provision for rapid survey dissemination. The improvement herein on the patented method described in commonly owned U.S. Pat. No. 4,355,372 overcomes these disadvantages of the prior art. Thus, although the concept of downstream loading of software per se is known in the prior art, such as disclosed in U.S. Pat. No. 4,064,490, and the concept of remote transmission of survey data over telephone lines per se is known in the prior art, such as disclosed in U.S. Pat. Nos. 3,210,472 and 3,950,618, and the concept of broadcast of survey questionnaires per se is also known, such as disclosed in U.S. Pat. Nos. 4,151,370, 4,107,735 and 3,546,791, there are no prior art electronic survey data collection and survey dissemination methods known to applicants which combine all of these features into an efficient, flexible and rapid market survey data collection and survey dissemination method in which interactive variable multiple question market survey questionnaires may be downstream loaded to a group of panelists and individually tailored for these panelists to obtain almost instantaneous survey responses at the head end for rapid tabulation and analysis, as well as follow up, of variable surveys. This, despite such prior art systems as disclosed in U.S. Pat. Nos. 4,331,973 and 4,331,974 which disclose systems for the transmission of targeted televison ads to panelists by panelist address match, in place of normal television ads, based on the prior storage of purchase demographics for the panelist transmitted to a host computer by a cooperating store using a UPC scan of the panelist's ID card and purchases, there are no satisfactory rapid survey collection and dissemination methods known to applicants, such as which permit rapid follow up and modification of surveys. Similarly, to applicants' knowledge the prior art electronic data collection systems discussed in U.S. Pat. No. 4,355,372, such as U.S. Pat. Nos. 3,942,157 and 4,016,542, have not been employed in connection with electronic collection of market survey data from diversely located panelists such as in the home and/or rapid survey dissemination, do not employ an interactive prompt message sequence, and moreover do not employ downstream loading of survey questionnaires. This is true as well for the type of prior art hand held data processing terminal disclosed in U.S. Pat. No. 4,115,870.

Thus, although remote transmission of electronic collected survey data is known in the prior art, these prior art systems are not flexible and do not readily enable the survey questionnaires to be rapidly disseminated, changed or modified based on the results of prior surveys so that no satisfactory prior art system or method known to applicants has been developed which enables variable market survey questionnaires to be rapidly disseminated to diversely located panelists from a central location and the resultant responses to be accumulatively processed at that central location in a rapid fashion. These disadvantages of the prior art are overcome by the present invention.

DISCLOSURE OF THE INVENTION

A method for independently centrally electronically accumulating market survey data from different content rapidly disseminated market surveys from a plurality of panelist stations located at diverse locations is provided in which variable multiple question market survey questionnaires to the diverse located panelist may be remotely rapidly disseminated and the resultant responses accumulatively processed at a central location in a rapid fashion. Each of the panelist stations is operatively remotely connectable to a central data processor or host computer via a common communications link, such as a conventional telephone type link for two way communication over telephone lines, or to a cable television link for downstream loading market survey programs with a telephone type return link for providing the resultant survey data to the host computer.

Visual display means, such as a video display such as CRT or conventional television monitor, or an alphanumeric display if a portable terminal similar to that disclosed in U.S. Pat. No. 4,355,372 is employed, is provided for displaying market survey questionnaires corresponding to a particular market survey content. Data input means, such as a conventional keyboard and/or optical wand is provided for providing data responses to the displayed market survey questionnaires. A microprocessor is provided at the panelist station for controlling the operation of the panelist station with temporary storage means at the panelist station temporarily storing a set of control instructions corresponding to a market survey questionnaire control program for controlling the operation of the microprocessor as well as temporarily storing market survey data responsive to the displayed market survey questionnaire. The temporary storage, such as RAM, is capable of temporarily storing different sets of control instructions corresponding to different content visually displayable market survey questionnaires or control programs, with the different sets of control instructions providing a different content visual display market survey questionnaire on the visual display means. The microprocessor controls the operation of the panelist station in accordance with a particular selected market survey questionnaire corresponding set of control instructions. A particular set of the control instructions is downstream loaded to a plurality of panelist stations from the central data processor over the common communications link, such as a telephone link. The downstream loaded set of control instructions is temporarily stored at the various panelist stations and the corresponding market survey questionnaire is selectively individually visually displayed at the panelist station, such as by panelist selection of the display in response to an alarm signal. The panelist then independelty inputs individualized responses to the displayed market survey questionnaire at the panelist station via the data input means. These individualized responses are locally processed to provide the market survey data which is independently temporarily stored at each of the panelist stations. This market survey data is then transmitted to the central data processor over the communications link, either manually or due to automatic polling, and then accumulatively processed. If desired, different sets of control instructions corresponding to diferent survey questionnaires may be rapidly downstream loaded to at least a portion or subgroup of the plurality of panelist stations whereby a plurality of different content market survey questionnaires may be selectively visually displayed and responded to for accumulative processing of the various market survey data corresponding to the different content market survey questionnaires.

In summary, in accordance with the presently preferred method of the present invention, different surveys may be rapidly downstream loaded to different panelists, multiple surveys may be rapidly disseminated to the same panelists, and there is an ability to rapidly change the survey content or interview group or conduct a modified survey based on the results of a prior survey, as well as individually tailor the downstream loaded surveys to the various panelists based on demographic input by the panelist.

BRIEF DESCRIPTION OF THE DRAWINGS

FIGS. 4–30 comprise a logic flow diagram of a typical downloadable interactive market survey questionnaire control program for use in practicing the presently preferred method of the present invention.

BEST MODE FOR CARRYING OUT THE INVENTION

Figure 1:
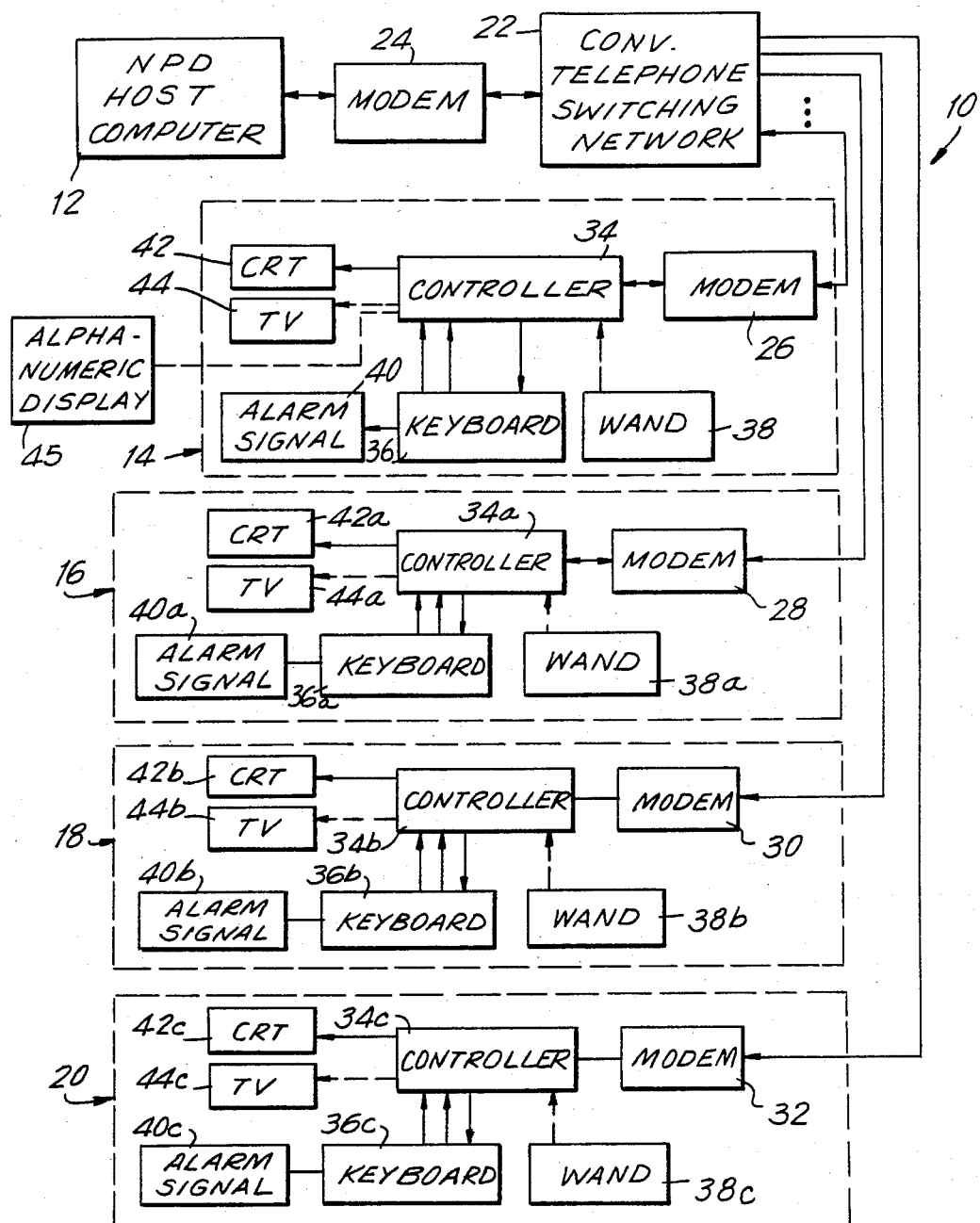
FIG. 1 is a functional block diagram of a preferred embodiment of the market survey data collection system for use is practicing the presently preferred method of the present invention.
Figure 2:
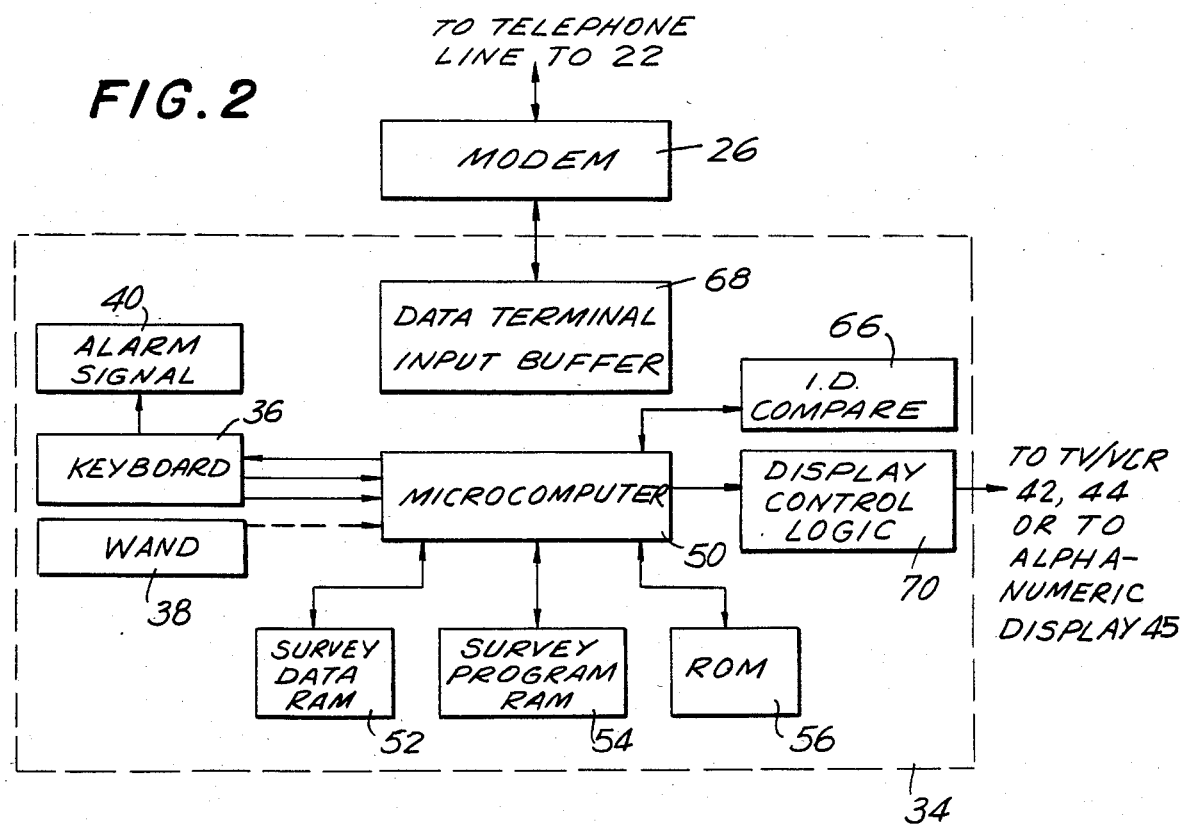
FIG. 2 is a block diagram of a presently preferred embodiment of a typical panelist station for use in the system of FIG; 1 in practicing the presently preferred method of the present invention.
Figure 3:
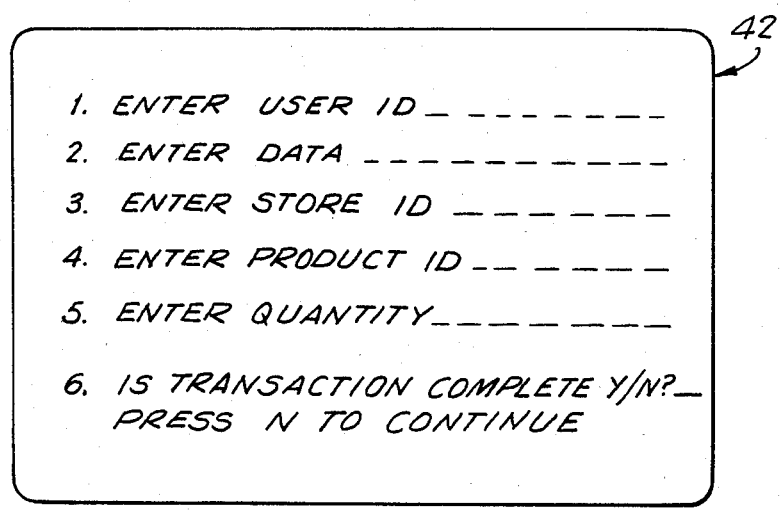
FIG. 3 is a diagrammatic illustration of a typical market survey questionnaire television display in accordance with the presently preferred method of the present invention.

Referring now to the drawings in detail, and initially to FIGS. 1–3, a typical embodiment of a market survey data collection and survey dissemination system, generally referred to by the reference numeral 10, which may preferably be employed in practicing the presently preferred method of the present invention is shown.

For all intents and purposes, this system 10, is very similar on the response mode to the system described in commonly owned U.S. Pat. No. 4,355,372, the contents of which are specifically incorporated by reference herein in their entirety. However, the system disclosed in U.S. Pat. No. 4,355,372 does not communicate with a central data processor to downstream loaded receive rapidly disseminated survey programs or questionnaires to control the operation of a panelist station or terminal and to transmit survey data back thereto based on responses to the survey questionnaires for rapid data collection and accumulative processing. As shown by way of example in FIG. 1, the market survey data collection and survey dissemination system 10 which may be employed in practicing the presently preferred data collection and survey dissemination method of the present invention includes a host computer 12, such as an HP 3000, or a PDP 8e or an IBM 4200, conventionally programmed to downstream load market survey questionnaire control programs in the form of sets of control instructions and to receive and accumulatively process survey data which has been transmitted back to the host computer 12 from the various panelist stations, such as due to automatic polling, with four such typical stations 14, 16, 18 and 20 being shown by way of example in FIG. 1. In the example of FIG. 1, the common communications link which links the various panelist stations 4, 16, 18 and 20 to the host computer 12 is a conventional two-way telephone network in which a conventional telephone switching network, represented by the reference numeral 22, which interfaces the various modems with the host computer 12 is employed. The survey data collection and survey dissemination system 10 illustrated in FIG. 1 preferably includes a conventional modem 24 linking the host computer 12 to the individual panelist stations 14, 16, 18 and 20 via the conventional telephone switching network 22 and, conventional modems 26, 28, 30 and 32 at the panelist stations 14, 16, 18 and 20, respectively.

A typical panelist station shall now be described in greater detail with reference to FIG. 2 which represents panelist station 14 by way of example, with the other panelist stations 16, 18 and 20 employing similar referenced numerals followed by the letter a, b, and c, respectively, for like functioning components. As shown and preferred, the typical panelist station 14 employed in practicing the presently preferred method of the present invention employs a system controller 34 to be described in greater detail hereinafter with reference to FIG. 2, a conventional keyboard 36 and/or optical character reading wand 38 for inputting data, such as demographics and survey data, to the panelist station 14, an alarm signal device 40, such as a conventional light or audio signal which is tripped when a survey control program is loaded into storage at the panelist station 14, and a conventional CRT or cathode ray tube 42 for visually displaying information such as the market survey questionnaire which corresponds to the downstream loaded survey control program. As also shown and preferred in FIG. 1, alternatively a conventional television receiver 44 may be employed in place of the CRT 42 or an alphanumeric display 45 such as the type referred to in U.S. Pat. No. 4,355,372. The system controller 34 at the panelist station 14, which is illustrated in greater detail in FIG. 2, preferably includes a conventional microcomputer or microprocessor 50, such as preferably an Intel 8048, 8748 or 8039, by way of example, depending on the program memory requirements. The microcomputer or microprocessor 50 is preferably provided with additional memory such as an external survey data RAM 52 and a separate external survey program RAM 54, such as Intel 5101 RAMs in sufficient quantity to provide any desired storage capacity in accordance with the system requirements. In this regard, since the survey program RAM 54 will temporarily store downstream loaded sets of control instructions corresponding to market survey questionnaire control programs in accordance with the presently preferred method of the present invention, this RAM 54 must be of sufficient storage capacity to store the required set of control instructions, and if desired, if multiple programs are to be downstream loaded and temporarily stored for selection by the panelist at the panelist station, then the capacity of RAM 54 must allow for storage of the desired quantity of multiple sets of control instructions. Similarly, the storage capacity of the survey data RAM 52 must be sufficient to accommodate the required responses, and whatever other information is desired, to the market survey questionnaires which are visually displayed and interacted with in a manner to be described in greater detail hereinafter.

In addition, an additional external ROM 56 is also provided for storing the executive control loader program for the microcomputer 50 which enables the microcomputer to downstream load the set or sets of control instructions to be stored in the survey program RAM 54. Such an executive control loader program is conventional and need not be described in greater detail hereinafter. The external RAMs 52 and 54 and the ROM 56, all of which are externally connected to the internal RAM and ROM, respectively, normally contained on the microprocessor chip 50, are preferably provided to increase the program and data memory space of the microprocessor chip 50. The keyboard 36 is preferably a conventional multikey keyboard which is preferably provided for inputting data, such as demographics and survey data responsive to the market survey questionnaire being visually displayed, such as on the CRT 42. Keyboard 36 preferably inputs the individualized responses to the displayed market survey questionnaire to the microcomputer 50 for local processing and temporary storage of the resultant market survey data in the survey data RAM 52. In addition, as shown and preferred in FIG. 2, the conventional optical character reading wand 38, such as an Intermec Model 1240, may preferably be employed to input bar code data, such as UPC label data, to the survey data RAM 52. In addition, as previously mentioned, the conventional alarm signal circuit 40 is preferably provided for providing an alarm indication, such as a light or a buzzer, when a market survey questionnaire or set of control instructions has been downstream loaded to the survey program RAM 54 so as to alert the panelist that a survey is to be responded to. If desired, this alarm condition may be omitted. As also shown and preferred in FIG. 2, a comparator 66 may also be provided for determining an identification match which may be used for tailoring surveys to panelists having certain demographic profiles which have been input to memory. In addition, the controller 34 also preferably includes a conventional data terminal input buffer 68, such as the type described in U.S. Pat. No. 3,889,054 if the system 10a is employed using a row grabbing terminal of the type described in that patent, or any other type of conventional data terminal input buffer which recognizes the incoming information and determines its nature. The system controller 34 also preferably includes conventional display control logic 70, such as, by way of example, the type referred to in U.S. Pat. Nos. 4,040,490 or 3,889,054, with the display control logic 70 preferably comprising conventional logic circuitry capable of executing any type of desired storable displayable function for the cathode ray tube 42 or television 44 in accordance with the controlled operation of the panelist station 14, with the display control logic 70 also preferably including a display buffer for storing the video display information prior to display on the CRT 42 or television 44 in a conventional manner.

Referring once again to the microcomputer 50 and the external RAMs 52, 54 and the ROM 56, although an Intel microprocessor was mentioned by way of example for microcomputer 50, it should be noted that preferably microcomputer 50 may be any type of integrated circuit microcomputer, such as, by way of further example, a Motorola 800 or a Rockwell International PPS-4 system, such as one comprising a Rockwell International 10636 CPU, Rockwell International 10696 I/O and Rockwell International 10432 ROM and RAM.

In accordance with the presently preferred method of the present invention, a set of control instructions corresponding to a market survey questionnaire is preferably downstream loaded from the NPD host computer 12 over the telephone type communications network 22 to the plurality of panelist stations 14, 16, 18 and 20. If desired, the set of control instructions could be downstream loaded either to an individual panelist in his home or to a personal interviewer in the field such as at a shopping mall. Moreover, although the set of control instructions in the system 10 illustrated in FIG. 1 is shown as being downstream loaded into a television set 44 or CRT display device 42, as previously mentioned, the survey or set of control instructions could be downstream loaded into a portable electronic recorder with sufficient display capability, such as the type of recorder described in U.S. Pat. No. 4,355,372 but with the ability to receive downstream loaded programs. In the case of a personal interviewer, the survey could be downstream loaded into such a portable electronic recorder or to a CRT display device similar to the type of panelist station 14 illustrated in FIGS. 1 and 2. Once the set of control instructions corresponding to a market survey questionnaire has been downstream loaded to the panelist stations 14, 16, 18 and 20, a verification procedure would preferably be initiated whereby a message would be sent back to the host computer 12 over the same telephone line link confirming the successful transmission of the survey set of control instructions. In this regard, for individual panelists, this type of verification procedure would be similar to what is known as a "mail-out count" and could be used by a market survey organization to assess response rates which are normally employed in studies where quota requirements are involved.

As was previously mentioned, a plurality of different surveys may be downstream loaded from the host computer 12 to different panelist stations with each station, in a conventional manner, having an associated identification number which could be "tagged" at the head end or host computer 12 to insure that only those panelist stations having the matching "tag" would receive that particular survey set of control instructions. In addition, multiple or different sets of survey control instructions corresponding to different content market survey questionnaires could be downstream loaded to the same panelist. Furthermore, upon receipt of survey data transmitted from the panelist stations 14, 16, 18 and 20 back at the host computer 12 and the resultant analysis thereof, a follow-up set of control instructions or market survey questionnaire having a content modified in accordance with the prior accumulatively processed market survey results could then be downstream loaded to the panelist stations 14, 16, 18 and 20 to rapidly follow-up on the survey. In addition, as previously mentioned, input demographics may be used to tailor surveys and to tailor the make up of subgroups of panelists in a rapid and efficient manner.

Figure 4:
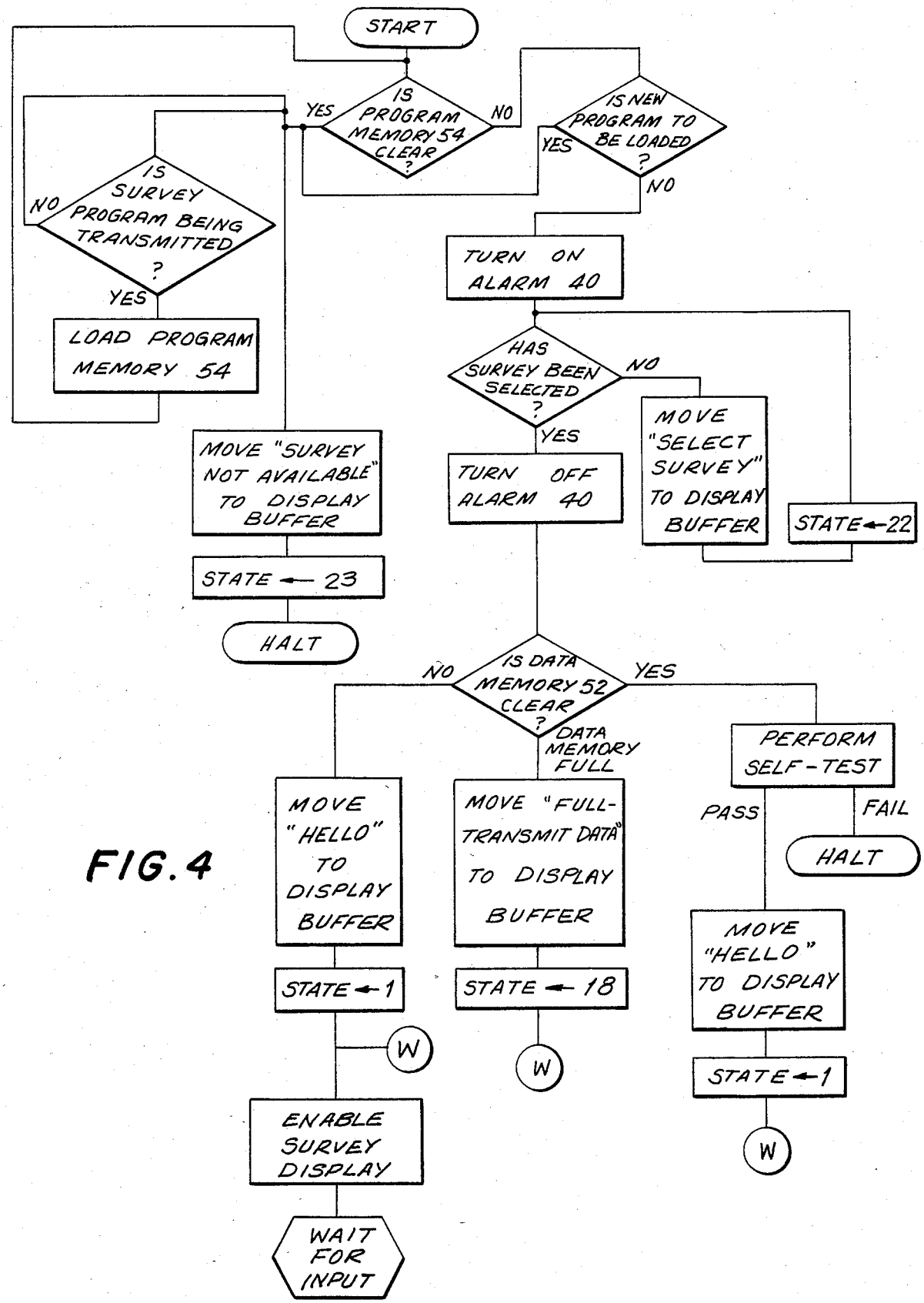
Figure 5:
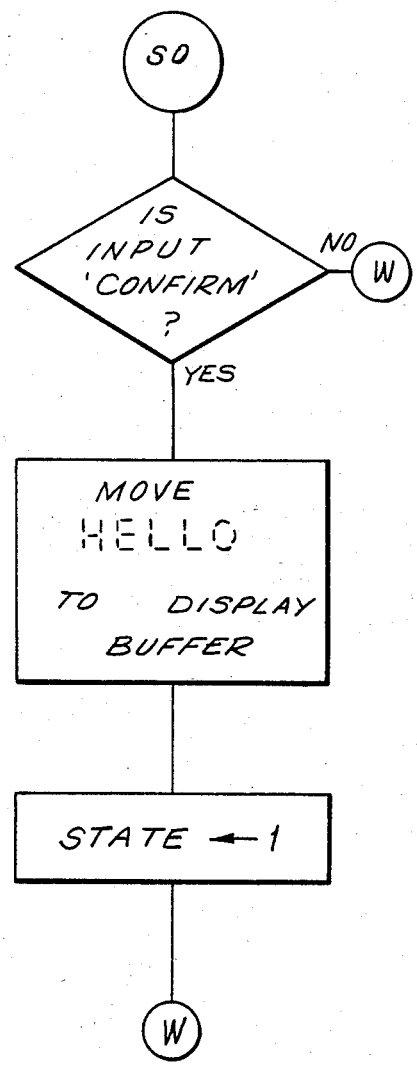
Figure 6:
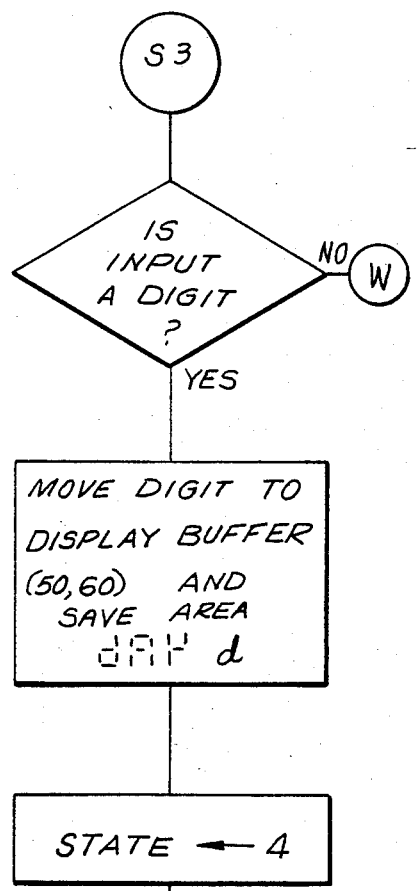
Figure 7:
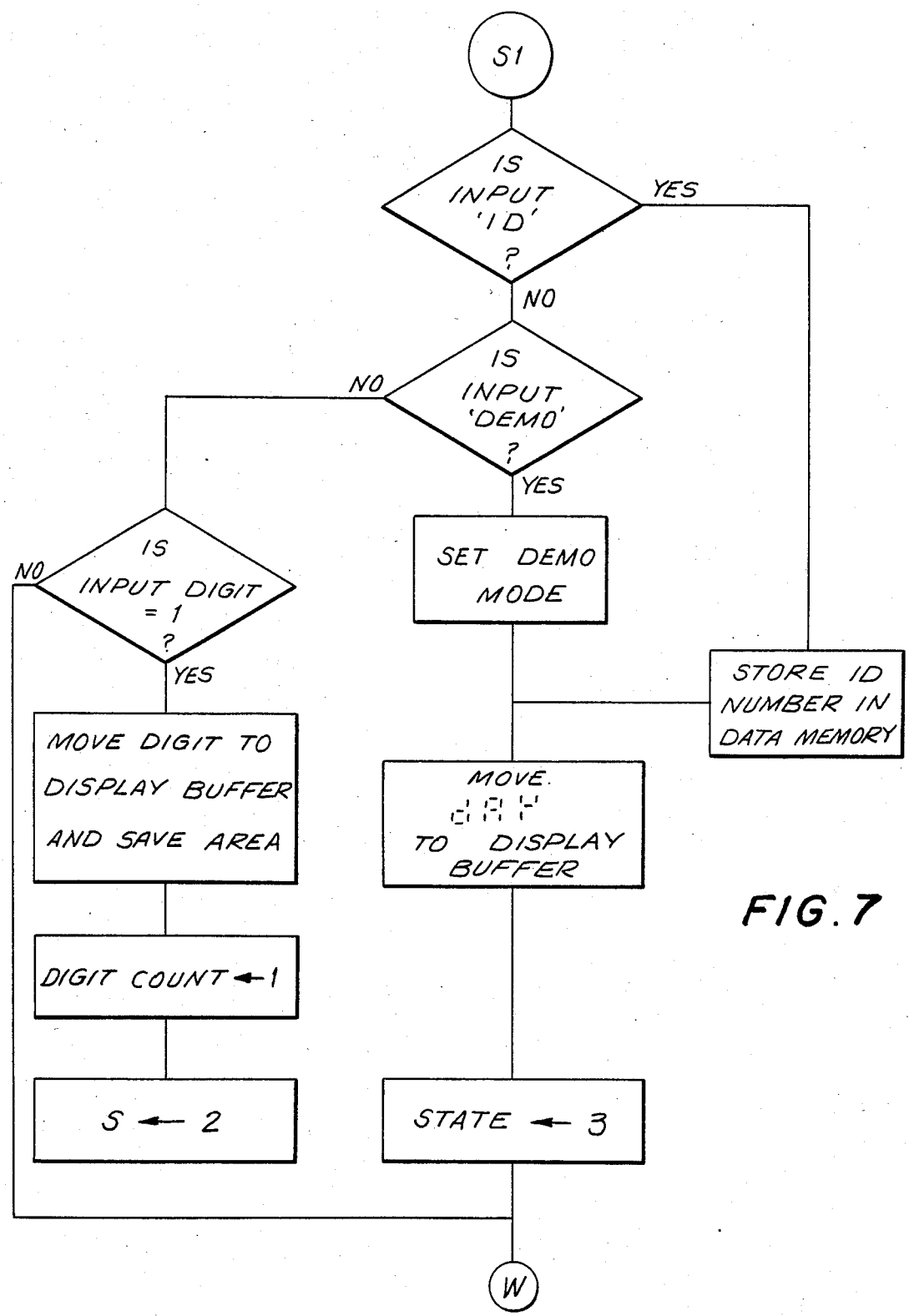
Figure 22:
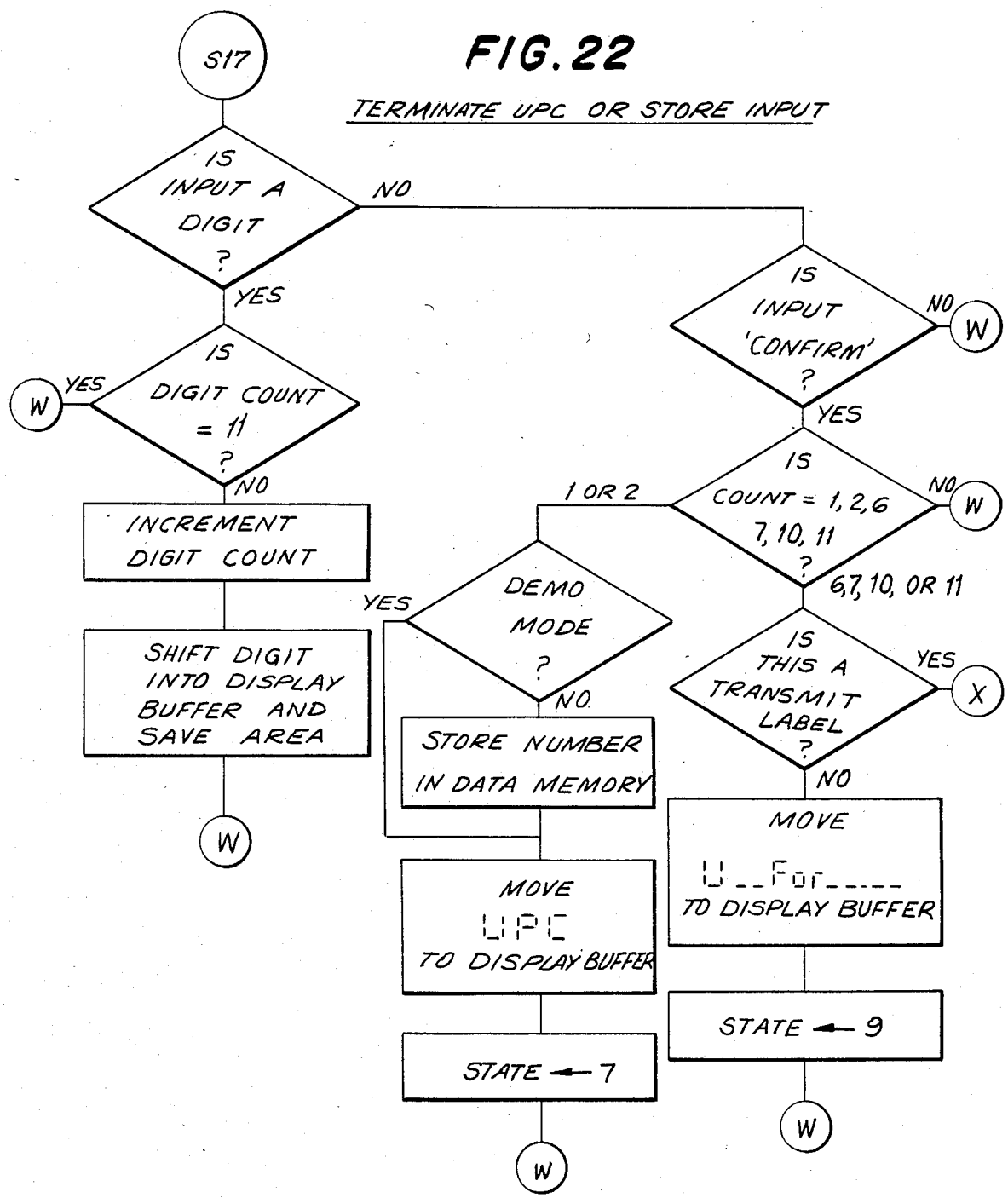
Figure 23:
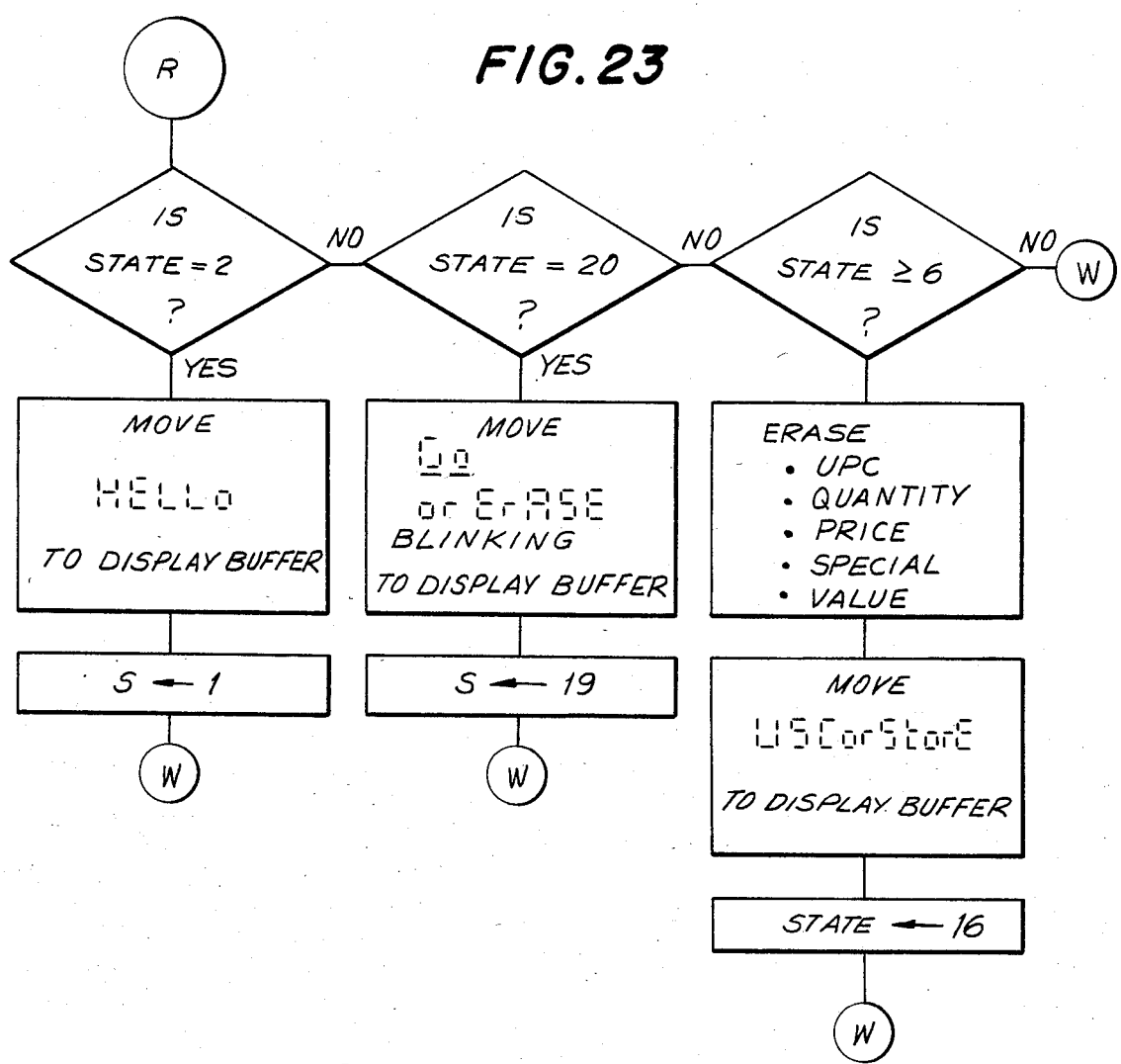
Figure 24:
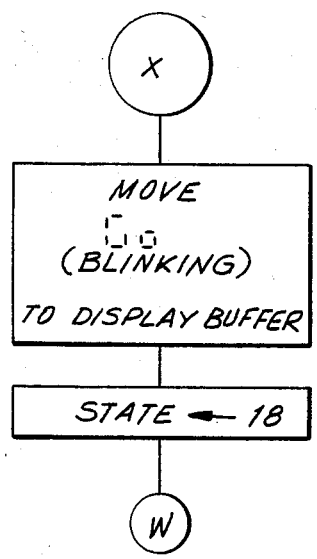
Figure 25:
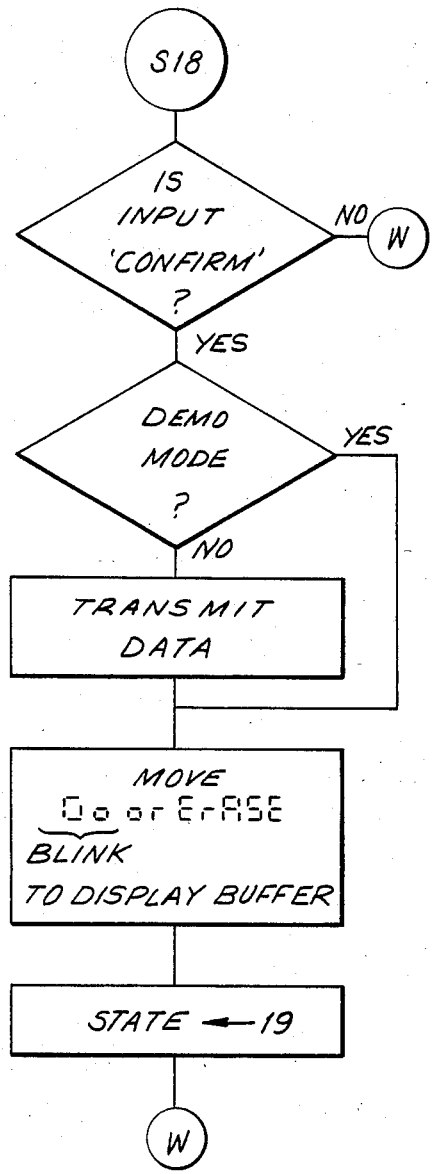
Figure 28:
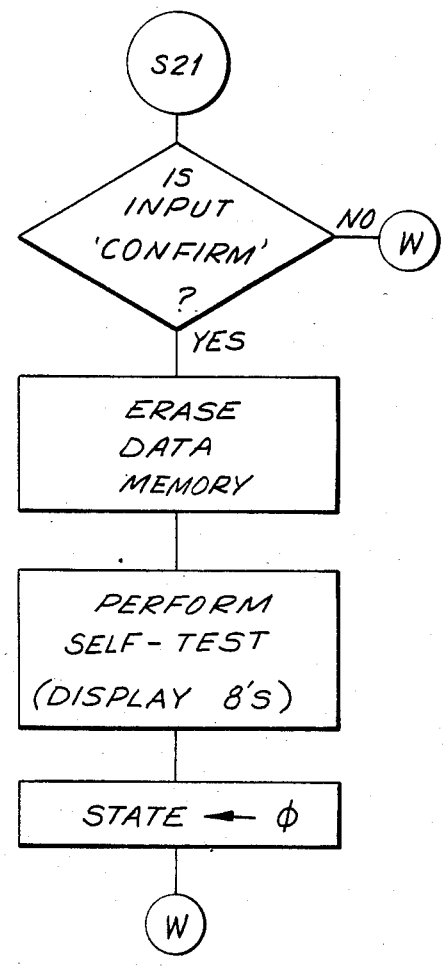
Figure 26:
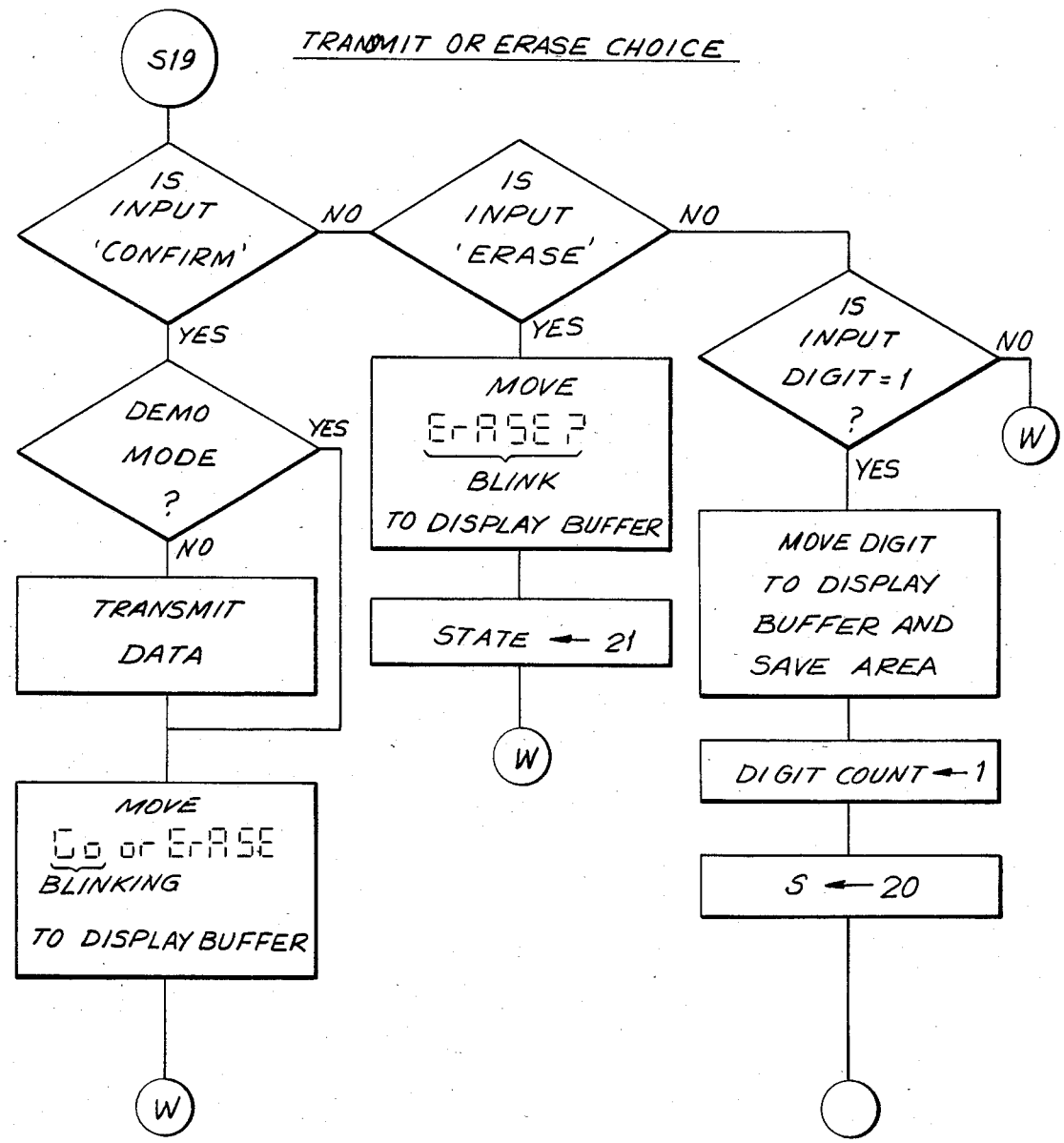
Figure 27:
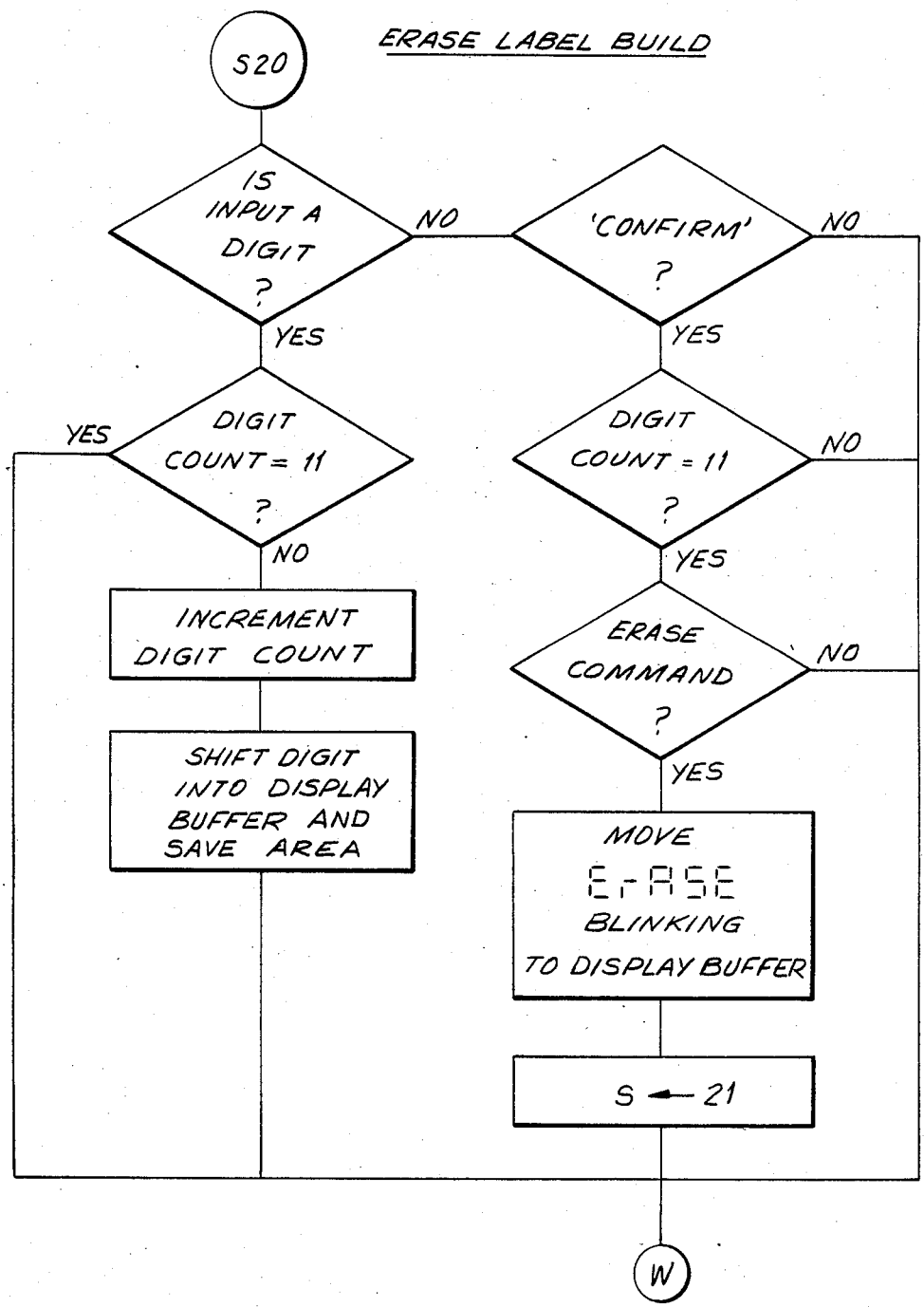

FIGS. 4-30 comprise an exemplary interactive survey control program set of instructions which could be downstream loaded to one or more panelist stations and through which the microprocessor 50 supervises and controls the overall operation of the panelist stations, such as panelist station 14, in accordance with a particular content market survey questionnaire control program. This program, which would be written in Intel assembler language if the microcomputer were an Intel device or, by way of example, in Rockwell assembler language if the microprocessor chip were a Rockwell device, is stored in the survey program RAM 54 associated with the microprocessor 50. It should be noted that except for FIG. 4, and a slight modification to the display messages in FIG. 29, the exemplary control program of FIGS. 4-30 is essentially identical to that described and illustrated in U.S. Pat. No. 4,355,372, the contents of which are specifically incorporated by reference herein in their entirety. The primary difference in FIG. 4 is the modifications to the exemplary control program of U.S. Pat. No. 4,355,372 to permit the downstream loading and alarm functions of the presently preferred method of the present invention which is an improvement over the method described in U.S. Pat. No. 4,355,372. Thus, in this regard, under the control of the executive control loader program stored in ROM 56, the microcomputer 50 determines whether the survey program memory 54 is clear when the panelist station is accessed either by the host computer 12 for purposes of downstream loading a survey control program or by the panelist via the keyboard 36 for purposes of inputting survey data. If the survey program memory 54 is clear indicating that no survey control program is stored therein, and the panelist attempts to provide survey data or other data to the system 14 for storage, the microcomputer 50 in conjunction with the display control logic 70 under control of the executive control loader program stored in ROM 56 preferably provides a message, such as "SURVEY NOT AVAILABLE" to the display buffer and therefrom to the CRT 42, by way of example, to display this message to the panelist. On the other hand, if the access to the microcomputer 50 is by the host computer 12 for purposes of downstream loading a set of control instructions corresponding to a survey program or market survey questionnaire, then the microcomputer under control of the executive control loader program first determines if a survey program is being transmitted and, if it is, then loads this set of control instructions into survey program RAM or memory 54, whereupon operation of the panelist station 14 in accordance with this downstream loaded set of control instructions is provided. Thus, as further shown and preferred in FIG. 4, with the program memory 54 loaded, the alarm 40 is turned on to alert the panelist to the presence of a survey to be responded to. If no survey has been selected, when the panelist accesses the system 14 the microcomputer 50 and the display control logic 70 preferably cause display of a message, such as "SELECT SURVEY". After a survey has been selected or, if desired, at any time, the alarm 40 may be turned off and the system 14 then checks to see if the data RAM or data memory 52 is clear to accept survey data provided via the keyboard 36 and/or wand 38 in response to the market survey questionnaire to be visually displayed, such as on the CRT 42. The balance of the functioning of the panelist station 14 at that point is thereafter essentially the same as that previously described in U.S. Pat. No. 4,355,372 with the exception that when the messages are displayed on a CRT 42 or television 44, if the data memory 54 is full, a message may preferably be displayed to the panelist, such as "FULL-TRANSMIT DATA" to alert the panelist to transmit data to the host computer 12 rather than await polling by the host computer 12. A typical video display provided in accordance with the market survey control program illustrated in FIGS. 4-30 is shown in FIG. 3.

Thus, at this point, in accordance with the exemplary market survey control program of FIGS. 4–30, an interactive interchangeable prompt message is displayed on the CRT 42 indicating one of a plurality of survey questions in a predefined sequence. An actual data input signal is provided via the keyboard 36 and/or wand 38 in response to the prompt message display, with this data input being stored in the survey data RAM 52 for subsequent transmission. Prior to storage in this survey data RAM 52, which temporarily stores this data, the data is preferably stored in a buffer, locally processed, and is displayed on the CRT 42 to enable confirmation prior to transfer to the survey data RAM main memory 52. When a confirmation command signal is provided to the microcomputer 50, the data input is then preferably transferred to the survey data RAM main memory 52 and the video display is changed to display the next prompt message in the current survey sequence. At the end of a survey sequence, a special marker is preferably inserted into the file as part of the data records for the particular survey sequence so that a distinction may be maintained such as in conjunction with multiple surveys. This entire procedure then preferably recycles for each independent survey sequence or questionnaire thereby enabling independent integral storage of each survey sequence. After the panelist has completely responded to the survey, the panelist may then activate a transmission mode which would cause the host computer 12 to be automatically dialed to effect the transmission. This in turn would conventionally call up special programming at the host computer 12 to monitor the transmission and to guide the panelist in transmitting the data. Also, a predefined sequence of instructions could be electronically prompted on the visual display, such as the CRT 42, to guide the panelist in effecting the transmission. At the end of the transmission, a confirmation signal would preferably be sent to the panelist station indicating a successful transmission and the survey data RAM 52 would be automatically cleared. As opposed to the aforementioned transmission procedure, the survey data could also be retrieved, as previously mentioned, through conventional automated polling by the host computer 12. The exemplary visual display of FIG. 3 could, of course, be modified in accordance with modifications to the survey program, such as if the user ID and/or date were resident in memory. As for the ID, this may be a number and/or alpha response. It should further be noted that the survey questions need not be in a predefined sequence in accordance with the method of the present invention. For example, the survey questions may be visually displayed in a tabular questionnaire to be completed by the panelist wherein multiple prompting is contained in a single visual display. Moreover, prompt messages can be displayed with respect to an entire survey or, if desired, with respect to only various portions thereof without departing from the method of the present invention.

Figure 31:
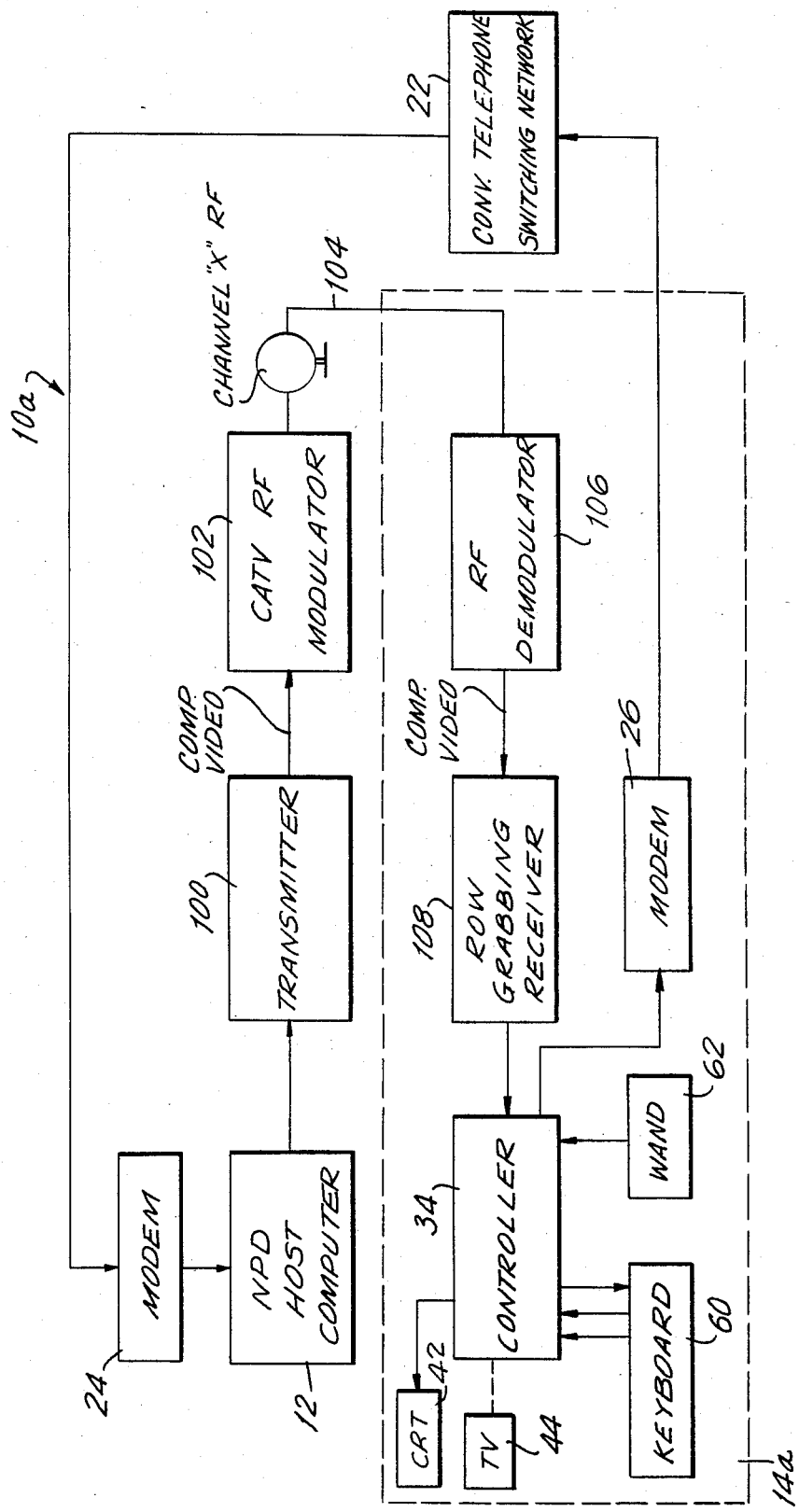
FIG. 31 is a functional block diagram, similar to FIG. 1, of an alternative embodiment of a market survey data collection system capable of being employed in practicing the presently preferred method of the present invention.

Referring now to FIG. 31, FIG. 31 illustrates an alternative embodiment of a system, generally referred to by the reference numeral 10a, for use in accordance with the presently preferred method of the present invention. The difference between system 10a and system 10 is the employment in system 10a of a row grabbing terminal such as described in U.S. Pat. No. 4,040,490, in which the survey program set of control instructions corresponding to the downstream loaded market survey questionnaire is provided in the form of row grabbing signals from a transmitter 100, via a conventional CATV RF modulator 102 over a dedicated channel 104 to the panelist station, such as 14a where it is demodulated in an RF demodulator 106 and then provided to a conventional row grabbing receiver 108 such as the type described in U.S. Pat. Nos. 4,040,490 and 3,889,054, both of which are incorporated by reference herein in their entirety. The controller 34, keyboard 36, wand 38 and CRT 42 or television 44 are preferably identical with that previously described with reference to system 10. In addition, the manner of providing the survey data back to the host computer 12 is preferably via the conventional telephone type link 22 previously described with respect to system 10 and the same reference numerals are employed. FIG. 31 illustrates only one typical panelist station 14a, by way of example, although multiple panelist stations are normally employed.

Summarizing the presently preferred market survey data collection and survey dissemination of the present invention, the survey control program is downstream loaded from the central host computer 12 over conventional telephone lines or a CATV cable programming network to the controllers 34 at the various panelist stations 14, 16, 18 and 20. The survey program received by the controller 34 is processed by an I/O buffer 68 and microcomputer 50 under control of the executive loader programs stored in ROM 56 and is loaded into the survey program RAM 54 for temporary storage and use. When the survey program is loaded into RAM 54, an alarm 40 is sent via the keyboard 36 to illuminate a light to alert the panelist that a survey must be responded to. This alarm 40 may be reactivated from the host computer 12 by transmission of an alarm control signal, if desired, if the panelist does not timely respond to the survey. The keyboard 36 and/or wand 38 is then used to respond to the downstream loaded survey questionnaire with the data response being locally processed and temporarily stored in RAM 52 for subsequent transmission.

This stored survey data may either be automatically polled and transmitted via telephone lines to the host computer 12 or may be manually transmitted via an interactive transmission prompt sequence in which the panelist takes an active role.

It should be noted that as further shown in FIG. 1, and as previously described, the method of the present invention also preferably encompasses downstream loading of the survey program set of control instructions to a portable terminal having an alphanumeric display 45 instead of a CRT 42 or TV 44, similar to the terminal described in U.S. Pat. No. 4,355,372 having the conventional modifications required to permit such downstream loading, such as illustrated in FIG. 2. In this regard, with respect to the balance of FIGS. 5–30 their description is essentially the same as that contained in U.S. Pat. No. 4,355,372 for FIGS. 20–45 thereof, which has been incorporated by reference herein, and need not be described again. Suffice it to say that the primary difference in the method of the present invention with respect to the type of visual display device relates to whether the messages to be visually displayed are to be displayed on an alphanumeric display 45, such as described in U.S. Pat. No. 4,355,372, or on a CRT 42 or TV 44 display, with this difference being a function of the nature of the signal, the manner of generating such a type of display being conventional.

In summary, by utilizing the market survey data collection and survey dissemination method of the present invention, variable market survey questionnaires to diverse located panelists may be remotely rapidly disseminated and the resultant responses rapidly collected and accumatively processed at a central location.

What is claimed:

1. A method for independently centrally electronically accumulating market survey data from different content rapidly disseminated market surveys from a plurality of panelist stations located at diverse locations; each of said plurality of panelist stations being operatively remotely connectable to a central data processor via a common communications link and each comprising visual display means capable of displaying different multiple inquiry market survey questionnaires corresponding to a particular market survey content for the panelist station in said plurality of panelist stations, corresponding data input means for providing data responses to said displayed market survey questionnaires for the panelist station, microprocessor means for controlling the operation of the panelist station, and temporary storage means for temporarily storing a set of control instructions for controlling the operation of said microprocessor means and for temporarily storing market survey data responsive to each displayed market survey questionnaire for the panelist station, said temporary storage means being capable of temporarily storing a plurality of different control instructions remotely selectable by said central data processor into different composite sets of control instructions corresponding to different content visually displayable market survey questionnaires, said different composite sets of control instructions providing different content visually displayable market survey questionnaires on said display means, said microprocessor means controlling the operation of the panelist station in accordance with a particular remotely selected market survey questionnaire corresponding composite set of control instructions for providing a corresponding content market survey questionnaire; said method comprising the steps of downstream loading said plurality of said control instructions to said plurality of panelist stations from said central data processor over said communications link; temporarily storing said downstream loaded plurality of control instructions at each respective panelist station in said temporary storage means, at least two portions of said plurality of panelist stations temporarily storing different composite sets of said control instructions for providing two or more different corresponding market survey questionnaire visual displays; visually displaying said different market survey questionnaires corresponding to said different composite sets of said downstream loaded plurality of control instructions on said corresponding display means at said portions of said plurality of panelist stations dependent on said remotely selected composite set of control instructions selected by said central data processor for each respective panelist station in said plurality; independently inputting a set of individualized responses to said different displayed market survey questionnaires at said portions of said plurality of panelist stations via said corresponding data input means; locally processing said individualized sets of input responses to said different displayed market survey questionnaires at said portions of said plurality of panelist stations to provide said market survey data corresponding to said different displayed market survey questionnaires; independently temporarily storing said set of individualized market survey data responses at each respective corresponding panelist station in said storage means; transmitting said temporarily stored market survey data responses to said central data processor over said communications link; and accumulatively processing said transmitted market survey data responses from said plurality of panelist stations at said central data processor; whereby different market survey questionnaires to diverse located panelists may be remotely rapidly disseminated and the resultant responses accumulatively processed at a central location in a rapid fashion.

2. An electronic market survey data collection and survey dissemination method in accordance with claim 1 wherein said downstream loading step for said different composite sets of control instructions comprises the step of downstream loading a different composite set of control instructions corresponding to a market survey questionnaire content modified in accordance with a prior accumulatively processed market survey.

3. An electronic market survey data collection and survey dissemination method in accordance with claim 1 wherein said downstream loading step comprises the step of downstream loading a plurality of different composite sets of said control instructions corresponding to different content market survey questionnaires to at least one common panelist station.

4. An electronic market survey data collection and survey dissemination method in accordance with claim 1 further comprising the step of inputting demographic data to said temporary storage means at said plurality of panelist stations, said temporary storing step comprising the step of temporarily storing said composite set of control instructions dependent on said input demographic data at said panelist station.

5. An electronic market survey data collection and survey dissemination method in accordance with claim 1 further comprising the step of transmitting an alarm signal over said communications link from said central data processor to said panelist stations when said composite set of control instructions has been downstream loaded to alert the panelist station.

6. An electronic market survey data collection and survey dissemination method in accordance with claim 1 further comprising the steps of electronically responding to a prompt message at said panelist station indicating a particular one of a plurality of market survey information categories in a predefined sequence of said categories in said corresponding displayed market survey questionnaire, said categories comprising at least product identification data and purchase demographic data; providing said individualized response data input signal to a buffer storage means in response to said prompt message, said provided individualized response data input signal comprising an actual data input corresponding to said particular category; selectively interactively processing said provided individualized response data input signal at said panelist station in said microprocessor means in accordance with said predefined sequence for providing said market survey data; providing a verification signal corresponding to said actual data input in response to the input thereof at said panelist station for verifying entry of said actual data input; providing a confirmation command input signal to said microprocessor means in response to said verification signal; and independently 7. An electronic market survey data collection and survey dissemination method in accordance with claim 6 wherein said market survey data input signal providing step comprises the step of optically scanning a product code on a product for providing said individualized response data input signal corresponding to said product identification data.

8. An electronic market survey data collection and survey dissemination method in accordance with claim 1 wherein said market survey data transmitting step further comprises the step of polling said panelist stations from said central data processor for obtaining said transmitted market survey data.

9. An electronic market survey data collection and survey dissemination method in accordance with claim 1 wherein said market survey questionnaires comprise multiple question survey questionnaires.

10. An electronic market survey data collection and survey dissemination method in accordance with claim 1 wherein said common communications link is a telephone type link.

11. An electronic market survey data collection and survey dissemination method in accordance with claim 1 wherein said common communications link comprises a CATV communications link.

12. An electronic market survey data collection and survey dissemination method in accordance with claim 1 wherein said visual display means is a video display means, said displayable market survey questionnaire being a video displayable market survey questionnaire, said display step comprising the step of selectively individually video displaying said market survey questionnaire corresponding to said downstream loaded composite set of control instructions on said video display means at each respective panelist station.

13. An electronic market survey data collection and survey dissemination method in accordance with claim 1 wherein said visual display means is an alphanumeric display means.

14. An electronic market survey data collection and survey dissemination method in accordance with claim 1 wherein said downstream loading step comprises the step of downstream loading a common composite set of said control instructions to at least one of said two portions of said plurality of panelist stations for providing a common content visually displayable market survey questionnaire at said one of said two portions of said plurality of panelist stations while enabling a different content visually displayable market survey questionnaire to be provided to the other of said two portions of said plurality of panelist stations in response to said corresponding downstream loaded different composite set of control instructions at said other portion of said plurality of panelist station.

15. An electronic market survey data collection and survey dissemination method in accordance with claim 1 further comprising the step of verifying said temporary storage of said downstream loaded set of control instructions to said central data processor over said communications link for providing a mail out type of verification of storage of said corresponding market survey questionnaires.

16. An electronic market survey data collection and survey dissemination method in accordance with claim 15 further comprising the step of providing a market associated with said set of individulized responses for identifying said responses corresponding to a given content market survey questionnaire.

17. An electronic market survey data collection and survey dissemination method in accordance with claim 1 further comprising the step of providing a market associated with said set of individulized responses for identifying said responses corresponding to a given content market survey questionnaire.

* * * * *

UNITED STATES PATENT AND TRADEMARK OFFICE
CERTIFICATE OF CORRECTION

PATENT NO. : 4,603,232
DATED : July 29, 1986
INVENTOR(S) : Lawrence G. Kurland et. al It is certified that error appears in the above—identified patent and that said Letters Patent is hereby corrected as shown below:

Col. 2, line 22: "4,151,370," should read --4,151,370;--

Col. 12, line 64: after "independently" insert
--storing said market survey data
input content of said buffer storage
means in a static memory means at
said panelist station in response to
said confirmation command input signal
and responding to the next prompt
message in said predefined sequence
in response to said confirmation command
input signal for providing a next
storable corresponding market survey
data input signal in response to
said next prompt message.--

Col. 14, line 26: "market" should read -- marker --

Col. 14, line 32: "market" should read --marker--

Signed and Sealed this

Twenty-sixth Day of April, 1988

*Attest:*

DONALD J. QUIGG

*Attesting Officer*  *Commissioner of Patents and Trademarks*